(12) United States Patent
Kino

(10) Patent No.: US 10,442,088 B2
(45) Date of Patent: Oct. 15, 2019

(54) HAND-HELD ROBOT TEACHING DEVICE

(71) Applicant: FANUC CORPORATION, Minamitsuru-gun, Yamanashi (JP)

(72) Inventor: Masaru Kino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/950,569

(22) Filed: Apr. 11, 2018

(65) Prior Publication Data
US 2018/0297212 A1 Oct. 18, 2018

(30) Foreign Application Priority Data

Apr. 13, 2017 (JP) ................. 2017-079963

(51) Int. Cl.
| | | |
|---|---|---|
| B25J 13/06 | (2006.01) | |
| B25J 9/00 | (2006.01) | |
| H01H 25/00 | (2006.01) | |
| H01H 89/00 | (2006.01) | |
| H01H 9/02 | (2006.01) | |
| H01H 21/24 | (2006.01) | |
| H01H 21/06 | (2006.01) | |

(52) U.S. Cl.
CPC ............ *B25J 13/06* (2013.01); *B25J 9/0081* (2013.01); *H01H 9/0214* (2013.01); *H01H 9/0235* (2013.01); *H01H 21/06* (2013.01); *H01H 21/24* (2013.01); *H01H 25/002* (2013.01); *H01H 89/00* (2013.01); *H01H 2025/004* (2013.01); *H01H 2217/034* (2013.01); *H01H 2217/048* (2013.01); *H01H 2221/044* (2013.01); *Y10S 901/03* (2013.01)

(58) Field of Classification Search
CPC . B25J 13/00; B25J 13/02; B25J 9/081; H01H 3/122; H01H 3/022; H01H 25/002; H01H 9/0214; H01H 9/0235; H01H 89/00; H01H 2217/048; H01H 2217/034; H01H 2025/004; H01H 2221/044; Y10S 901/03; G05B 19/04
See application file for complete search history.

(56) References Cited

U.S. PATENT DOCUMENTS 7,154,197 B2    12/2006  Suita et al.
2003/0079973 A1*  5/2003  Sun .................. H01H 9/0214
                                                  200/52 R

FOREIGN PATENT DOCUMENTS

JP    9-085660 A    3/1997
JP    09225873 A   9/1997
(Continued)

*Primary Examiner* — Vanessa Girardi
(74) *Attorney, Agent, or Firm* — RatnerPrestia

(57) ABSTRACT

A robot teaching device allowing a user to operate an enable switch provided on the robot teaching device in a similar manner regardless of the user's dominant hand. A hand-held robot teaching device includes an enable switch built-in includes a main body including a holding portion that is configured to be held by one hand, and an enable switch operating section that is provided on the holding portion and is configured to be operated by a reference switching motion of a hand holding the holding portion in a reference position. The enable switch operating section includes a switching motion specifying mechanism that makes the reference switching motion in the reference position easier than another motion.

10 Claims, 31 Drawing Sheets

(56) References Cited

FOREIGN PATENT DOCUMENTS

| | | | |
|---|---|---|---|
| JP | 11288310 | A | 10/1999 |
| JP | 2002355781 | A | 12/2002 |
| JP | 2004122243 | A | 4/2004 |
| JP | 2006245857 | A | 9/2006 |
| JP | 2016060018 | A | 4/2016 |
| JP | 2016221644 | A | 12/2016 |

* cited by examiner

HAND-HELD ROBOT TEACHING DEVICE

CROSS-REFERENCE TO RELATED APPLICATION

This application is a new U.S. Patent Application that claims benefit of Japanese Patent Application No. 2017-079963, filed Apr. 13, 2017, the disclosure of this application is being incorporated herein by reference in its entirety for all purposes.

BACKGROUND OF THE INVENTION

1. Field of the Invention

The invention relates to a hand-held robot teaching device.

2. Description of the Related Art

A robot teaching device that enables operation by a left-handed user and a right-handed user has been known (e.g., JP 9-85660 A).

A technology is required that allows a user to operate an enable switch provided on a robot teaching device in a similar manner regardless of whether the user is a left-handed user or a right-handed user.

SUMMARY OF THE INVENTION

In an aspect of the present disclosure, a hand-held robot teaching device having an enable switch therein, includes a main body including a holding portion configured to be held by one hand; and an enable switch operating section provided at the holding portion and configured to be operated by a reference switching motion by a hand which holds the holding portion at a reference position, wherein the enable switch operating section includes a switching motion specifying mechanism configured to facilitate the reference switching motion at the reference position to be easier than another motion.

According to an aspect, the enable switch operating section can be operated by the same reference switching motion regardless of whether a user is a left-handed user or a right-handed user.

BRIEF DESCRIPTION OF THE DRAWINGS

The objects, features and advantages of the invention will become more apparent from the following description of the embodiments in connection with the accompanying drawings, wherein.

DETAILED DESCRIPTION

Figure 1:
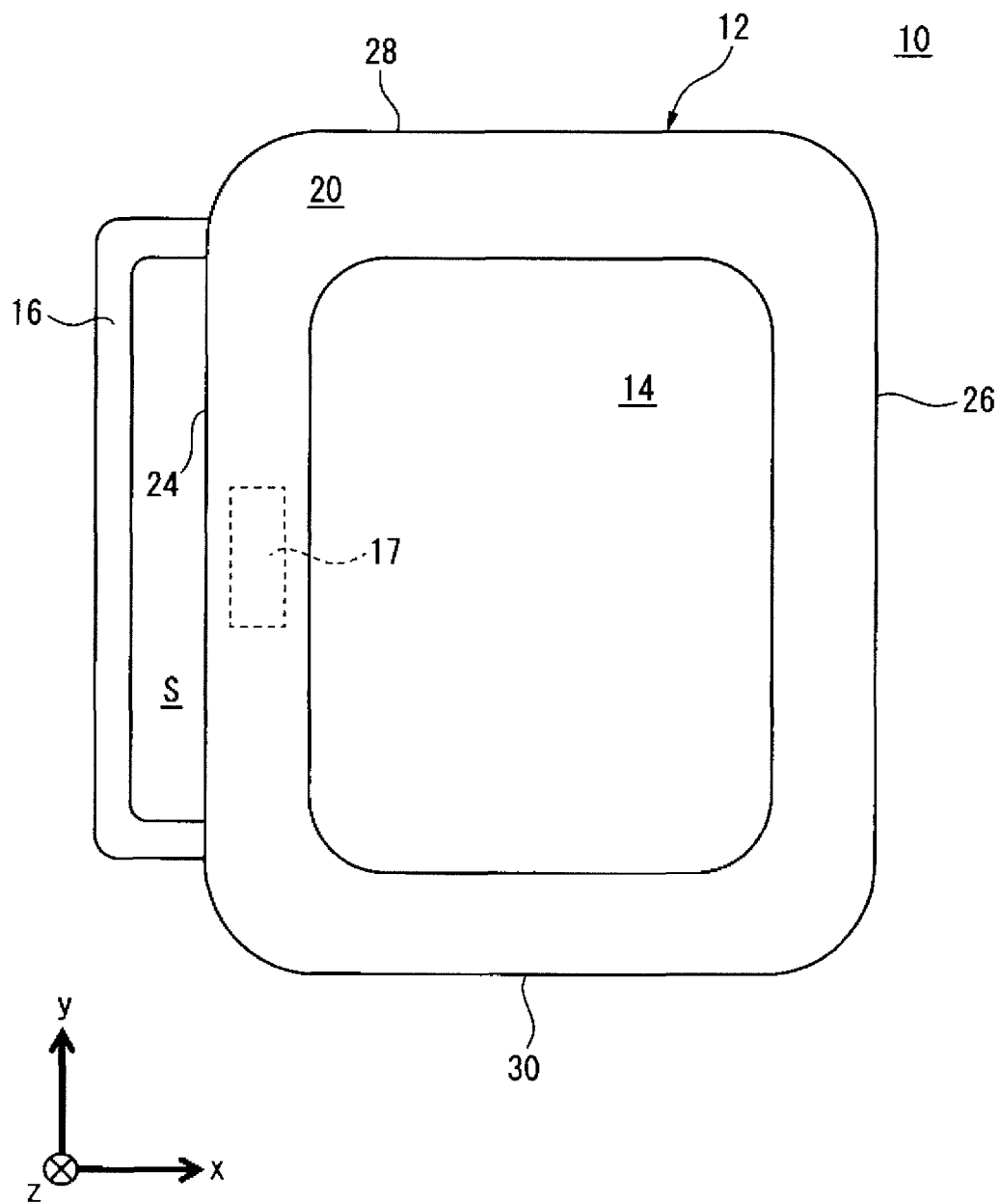
FIG. 1 is a front view of a robot teaching device according to an embodiment.

Hereinafter, embodiments of the present disclosure will be described in detail with reference to the drawings. Note that, in the various embodiments described below, the same reference numerals will be given to similar components, and redundant explanations will be omitted. In the following description, a Cartesian coordinate system in the drawings is used as a standard for direction.

A robot teaching device 10 according to an embodiment is described with reference to FIGS. 1 to 6. The robot teaching device 10 is a hand-held device to be held by a user to use for teaching a robot (not illustrated). The robot teaching device 10 is communicably connected to an external device such as a robot controller (not illustrated), and teaches a robot in accordance with an operation by the user while communicating with the external device.

The robot teaching device 10 includes a main body 12, a display 14, a hand guide 16, an enable switch 17, and an enable switch operating section 18. In this embodiment, the main body 12 has a substantially rectangular outer shape as seen from a z-axis direction, and includes a front surface 20, a back surface 22, a side surface 24, a side surface 26, a side surface 28, and a side surface 30.

The front surface 20 defines an end face in a z-axis negative direction of the main body 12. The back surface 22 is located opposite the front surface 20, and defines an end face in a z-axis positive direction of the main body 12. The side surfaces 24, 26, 28, and 30 extend between the front surface 20 and the back surface 22.

The side surface 24 defines an end face in an x-axis negative direction of the main body 12. The side surface 26 is located opposite the side surface 26, and defines an end face in an x-axis positive direction of the main body 12. The side surface 28 defines an end face in a y-axis positive direction of the main body 12. The side surface 30 is located opposite the side surface 28, and defines an end face in a y-axis negative direction of the main body 12.

The display 14 includes a CRT, an LCD, an organic EL display, etc., and displays various information as an image. The display 14 is arranged on the front surface 20 of the main body 12. Note that, the display 14 may include a touch sensor on its surface. In this case, the user can input information to the robot teaching device 10 by touching the touch sensors.

The hand guide 16 is provided on the side surface 24 of the main body 12. The hand guide 16 has a substantially U-shaped outer shape as seen from the z-axis direction, and defines a space S that accommodates a hand of the user.

The enable switch 17 is built in the main body 12. The enable switch 17 includes an openable and closable contact, wherein the enable switch 17 is turned ON when the contact is closed, while the enable switch 17 is turned OFF when the contact is opened.

The enable switch operating section 18 is provided on the back surface 22 of the main body 12. The enable switch operating section 18 includes a base 32, a moving portion 34, springs 36 (FIG. 3), and position retaining mechanisms 38 and 40. The springs 36 are built in the main body 12, and urges the base 32 in the z-axis positive direction.

The base 32 is received in a hole 42 formed at the main body 12 such that the base 32 is movable in the z-axis direction. The base 32 includes an end face 32a in the z-axis positive direction, and the end face 32a faces to the outside.

In this embodiment, the base 32 is provided at the main body 12 such that the end face 32a thereof is placed at a position in the z-axis direction the same as that of the back surface 22 of the main body 12, or at a position displaced in the z-axis negative direction from the back surface 22.

In this embodiment, the base 32 is provided so as to be pressed in the z-axis negative direction by two levels. Specifically, the base 32 is arranged at a first switch position by the action of the spring 36 when no pressing force is applied thereto by the user. While the base 32 is arranged at the first switch position, the enable switch 17 is turned OFF, and the motion of the robot it stopped.

When force in the z-axis negative direction is applied by the user to the base 32 arranged at the first switch position, the base 32 is pressed to a second switch position displaced from the first switch position in the z-axis negative direction. When the base 32 is arranged at the second switch position, the enable switch 17 is turned ON, and the robot can be taught and operated through the robot teaching device 10 and the robot controller.

When force in the z-axis negative direction is further applied to the base 32 arranged at the second switch position, the base 32 is pressed to a third switch position displaced from the second switch position in the z-axis negative direction. When the base 32 is arranged at the third switch position, the enable switch 17 is turned OFF and the motion of the robot is stopped.

Figure 4:
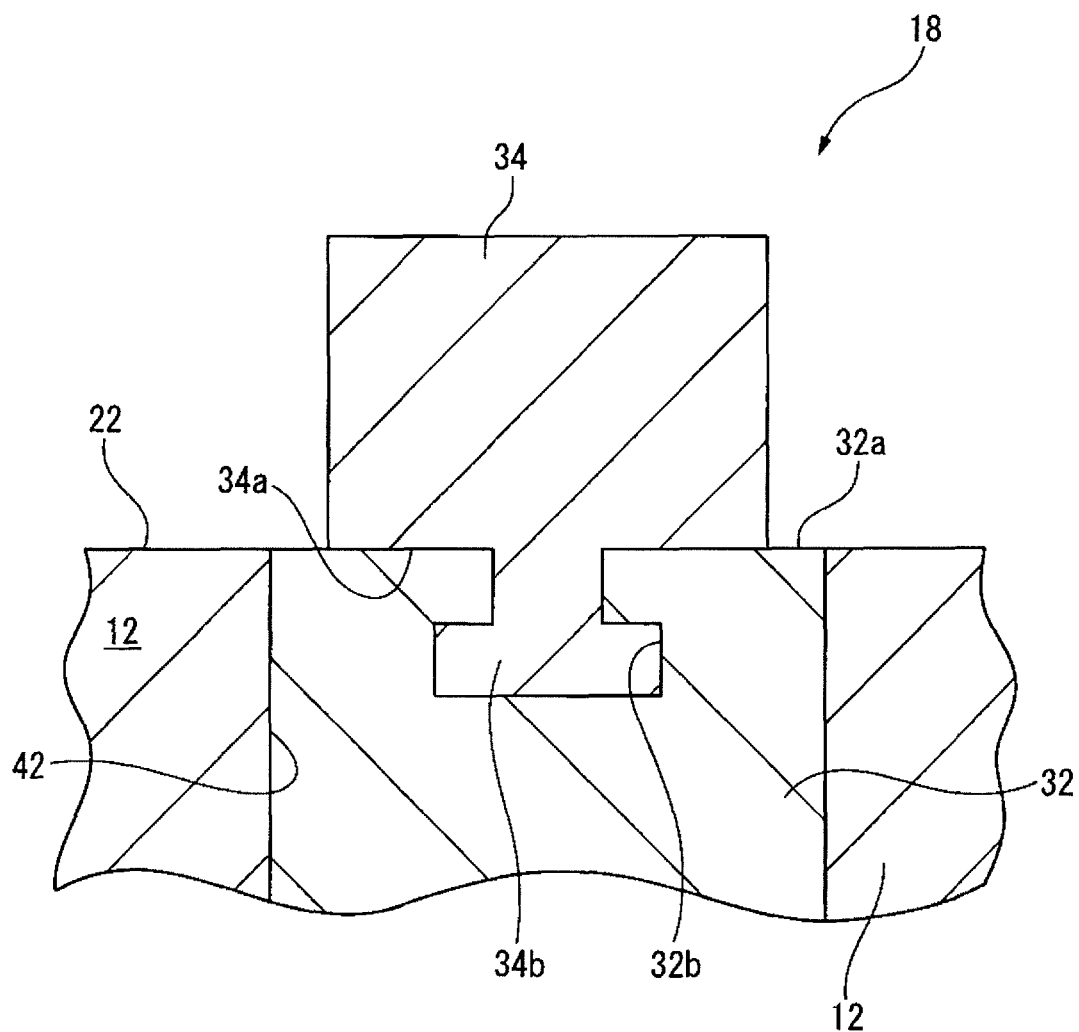
FIG. 4 is a cross-sectional view taken along IV-IV in FIG. 2.

The moving portion 34 is provided so as to be slidable in the y-axis direction on the end face 32a of the base 32. More specifically, as illustrated in FIG. 4, the moving portion 34 includes a rail 34b protruding in the z-axis negative direction from an end face 34a in the z-axis negative direction thereof. The rail 34b has a substantially T-shaped cross-section, and extends linearly in the y-axis direction.

On the other hand, a recess 32b is formed at the base 32 so as to be recessed inward from the end face 32a in the z-axis positive direction of the base 32. The recess 32b has a substantially T-shape corresponding to the rail 34b, and extends linearly in the y-axis direction.

The rail 34b is received in the recess 32b and engaged the recess 32b so as to be slidable. Due to this, the moving portion 34 is slidable in the y-axis direction on the end face 32a of the base 32 while being prevented from falling off from the base 32.

Thus, in this embodiment, the moving portion 34 is provided to be movable with respect to the base 32 in a direction (i.e. y-axis direction) orthogonal to the pressing direction of the base 32 (i.e. z-axis direction).

Figure 2:
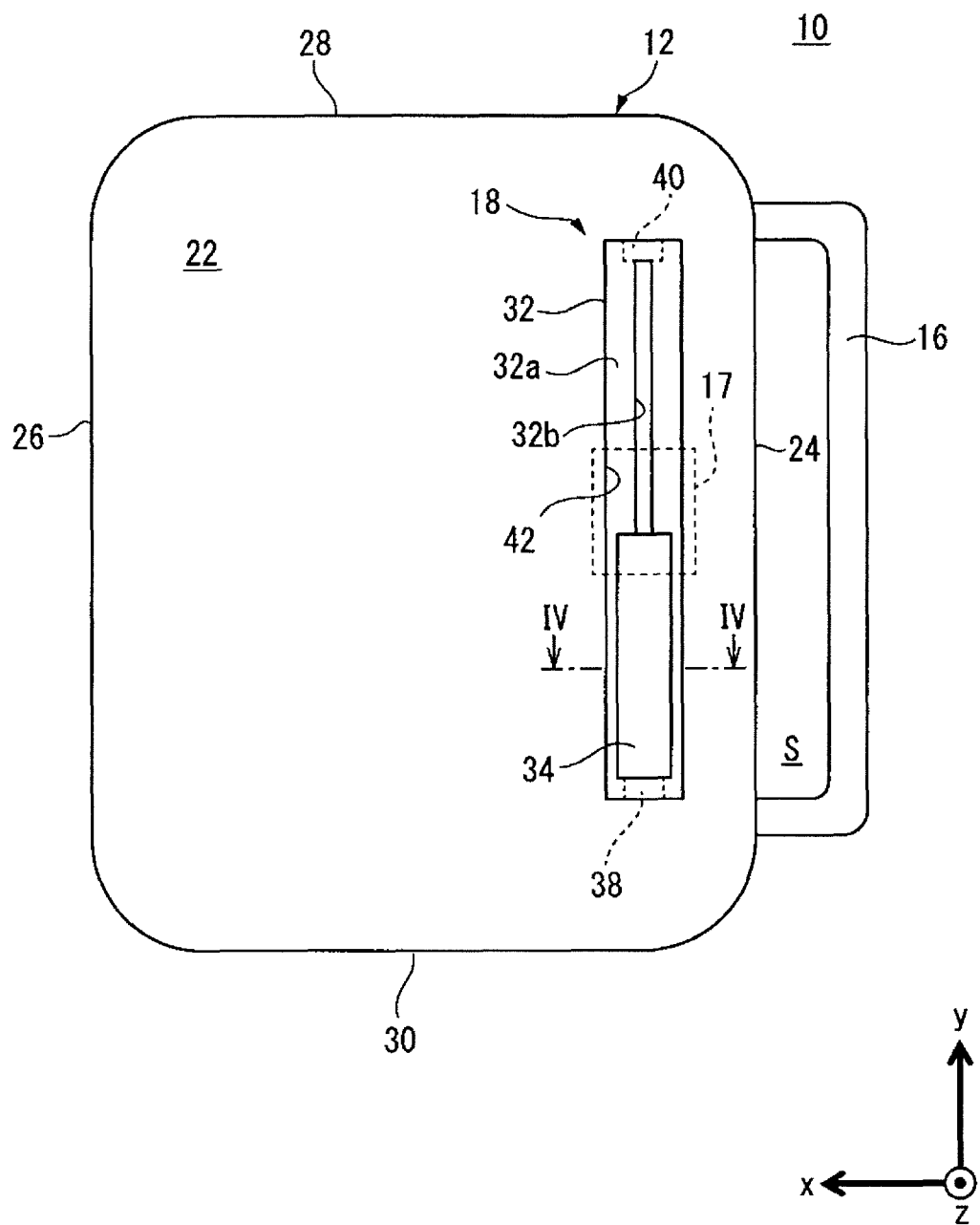
FIG. 2 is a back view of the robot teaching device illustrated in FIG. 1.
Figure 3:
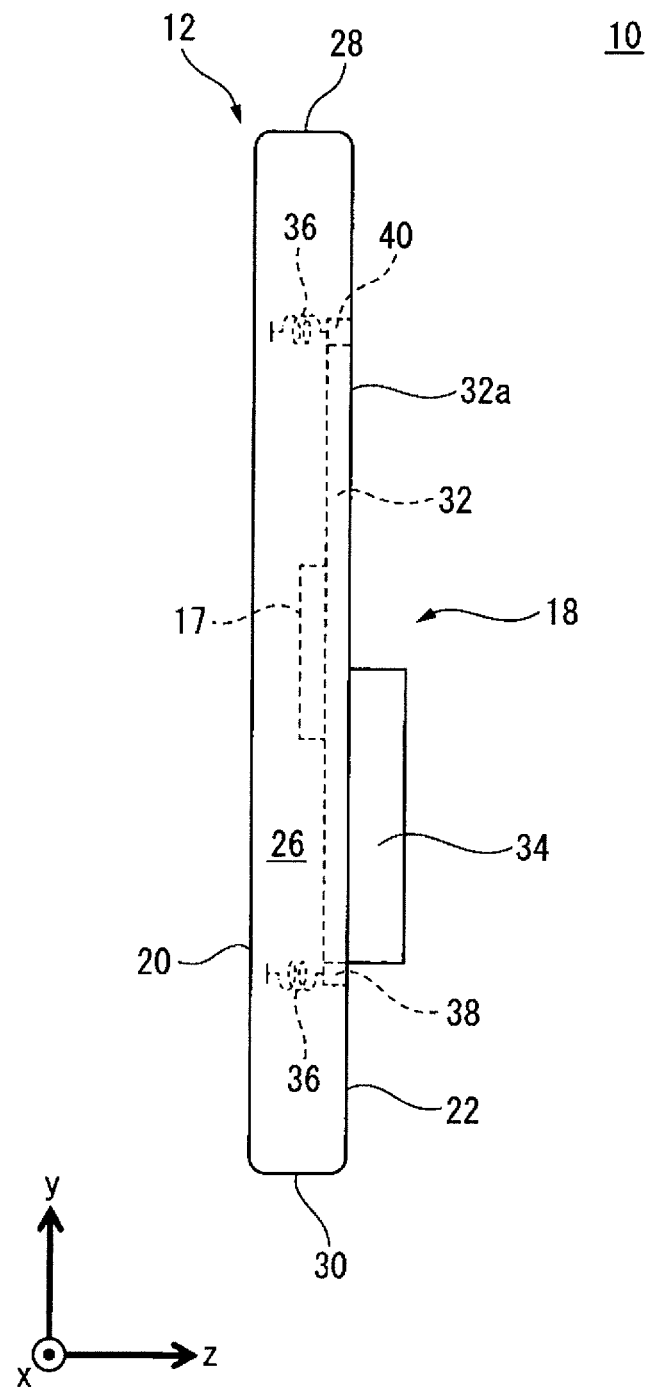
FIG. 3 is a side view of the robot teaching device illustrated in FIG. 1.

A movement stroke in the y-axis direction of the moving portion 34 is defined by both ends in the y-axis direction of the recess 32b. In FIGS. 2 and 3, the moving portion 34 is arranged at a first end (i.e. an end in the y-axis negative direction. A first position) of the movement stroke thereof.

The position retaining mechanism 38 releasably retains the moving portion 34 when the moving portion 34 is arranged at the first end of the movement stroke. The position retaining mechanism 38 may be comprised of e.g. a pair of magnets attracting each other, a snap-fit mechanism, or a hook-and-loop fastener.

For example, if the position retaining mechanism 38 is comprised of a pair of magnets, one of the pair of magnets is provided in the moving portion 34 while the other magnet is provided in the base 32. In this case, when the moving portion 34 is arranged at the first end, the pair of magnets attract each other, thereby the moving portion 34 is retained at the first end.

If the position retaining mechanism 38 is comprised of a snap-fit mechanism, the snap-fit mechanism includes an engaging portion provided at the moving portion 34 while an engaged portion is provided at the base 32 so as to be detachably engaged with the engaging portion. In this case, when the moving portion 34 is arranged at the first end, the engaging portion and the engaged portion of the snap-fit mechanism are engaged with each other, thereby the moving portion 34 is retained at the first end.

If the position retaining mechanism 38 is comprised of a hook-and-loop fastener, the position retaining mechanism 38 includes a first hook-and-loop fastener provided at the moving portion 34 while a second hook-and-loop fastener provided at the base 32 so as to be detachably engaged with the first hook-and-loop fastener. In this case, when the moving portion 34 is arranged at the first end, the first hook-and-loop fastener and the second hook-and-loop faster are engaged with each other, thereby the moving portion 34 is retained at the first end.

If the user applies force greater than a predetermined threshold value in the y-axis positive direction to the moving portion 34 when the position retaining mechanism 38 retains the moving portion 34 at the first end, the position retaining mechanism 38 releases the moving portion 34.

Due to this, the user can move the moving portion 34 in the y-axis positive direction with respect to the base 32. The threshold value of force necessary to release the moving portion 34 from the position retaining mechanism 38 is determined by a type (magnet, snap-fit mechanism, hook-and-loop fastener, etc.) and property of the position retaining mechanism 38.

Figure 5:
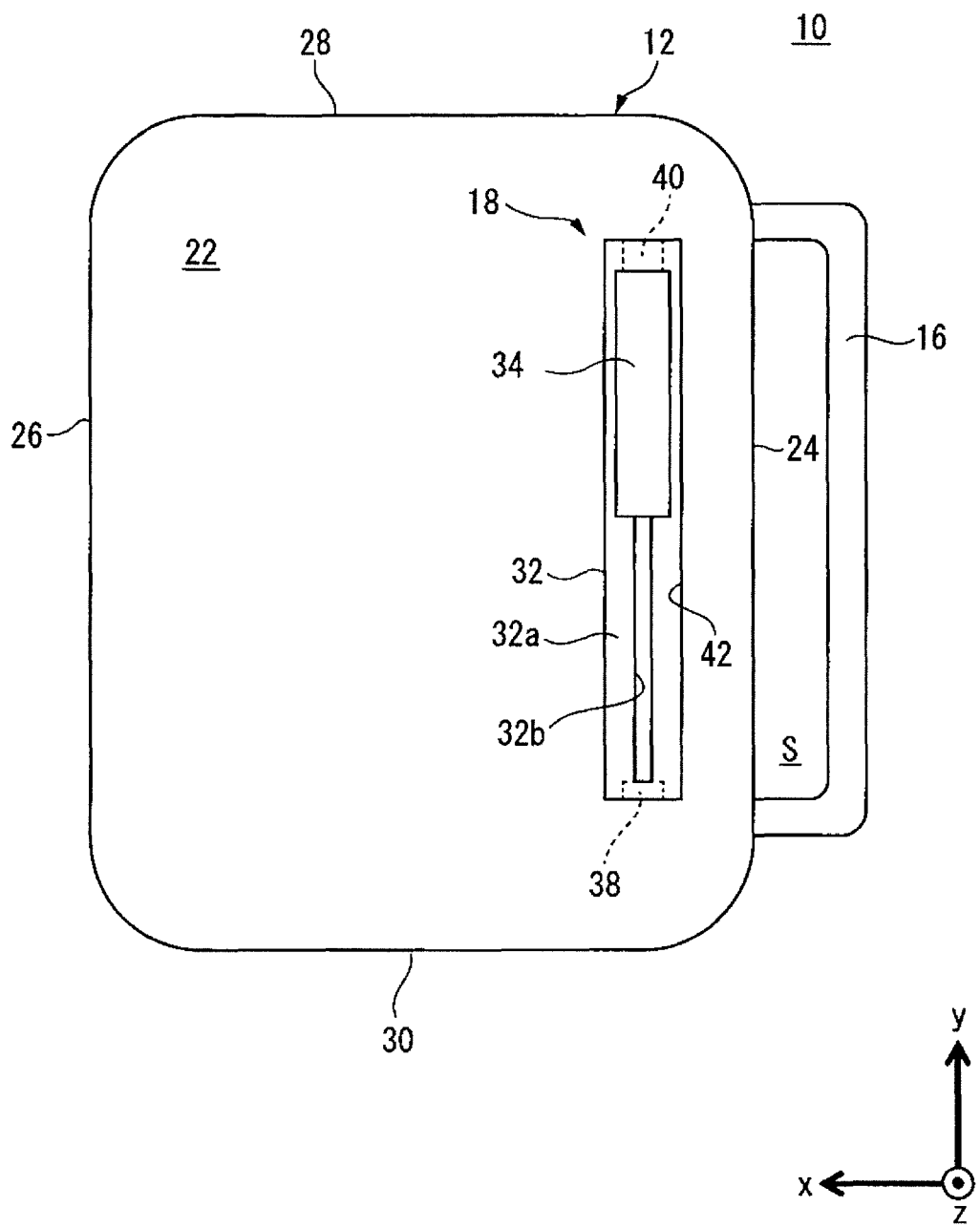
FIG. 5 illustrates a state where a moving portion of an enable switch illustrated in FIG. 2 is moved in a y-axis positive direction in FIG. 2.
Figure 6:
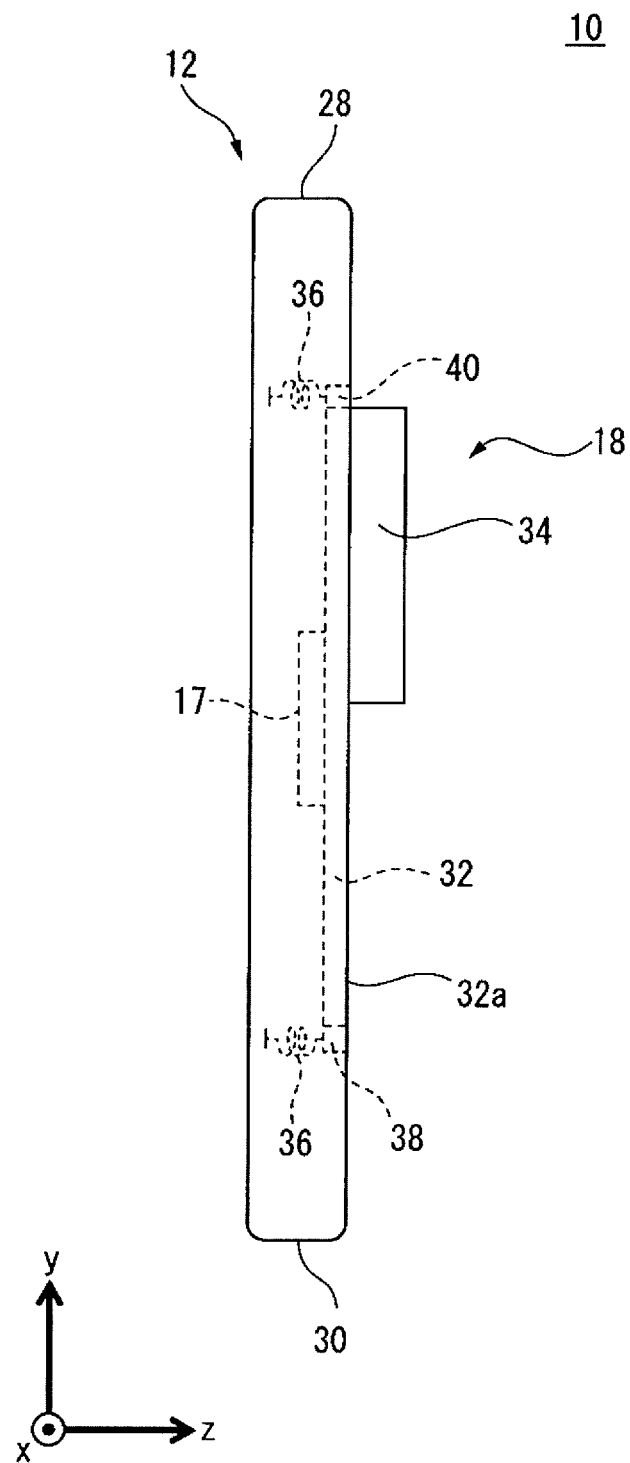
FIG. 6 is a side view of the robot teaching device illustrated in FIG. 5.

When the moving portion 34 is moved in the y-axis positive direction, the moving portion 34 reaches a second end (i.e., an end in the y-axis positive direction. A second position) of the movement stroke thereof, as illustrated in FIGS. 5 and 6. The position retaining mechanism 40 retains a position of the moving portion 34 when the moving portion 34 is arranged at the second end of the movement stroke. The position retaining mechanism 40 has the same configuration as the position retaining mechanism 38, and may be comprised of e.g. a pair of magnets, a snap-fit mechanism, or a hook-and-loop fastener.

Figure 7:
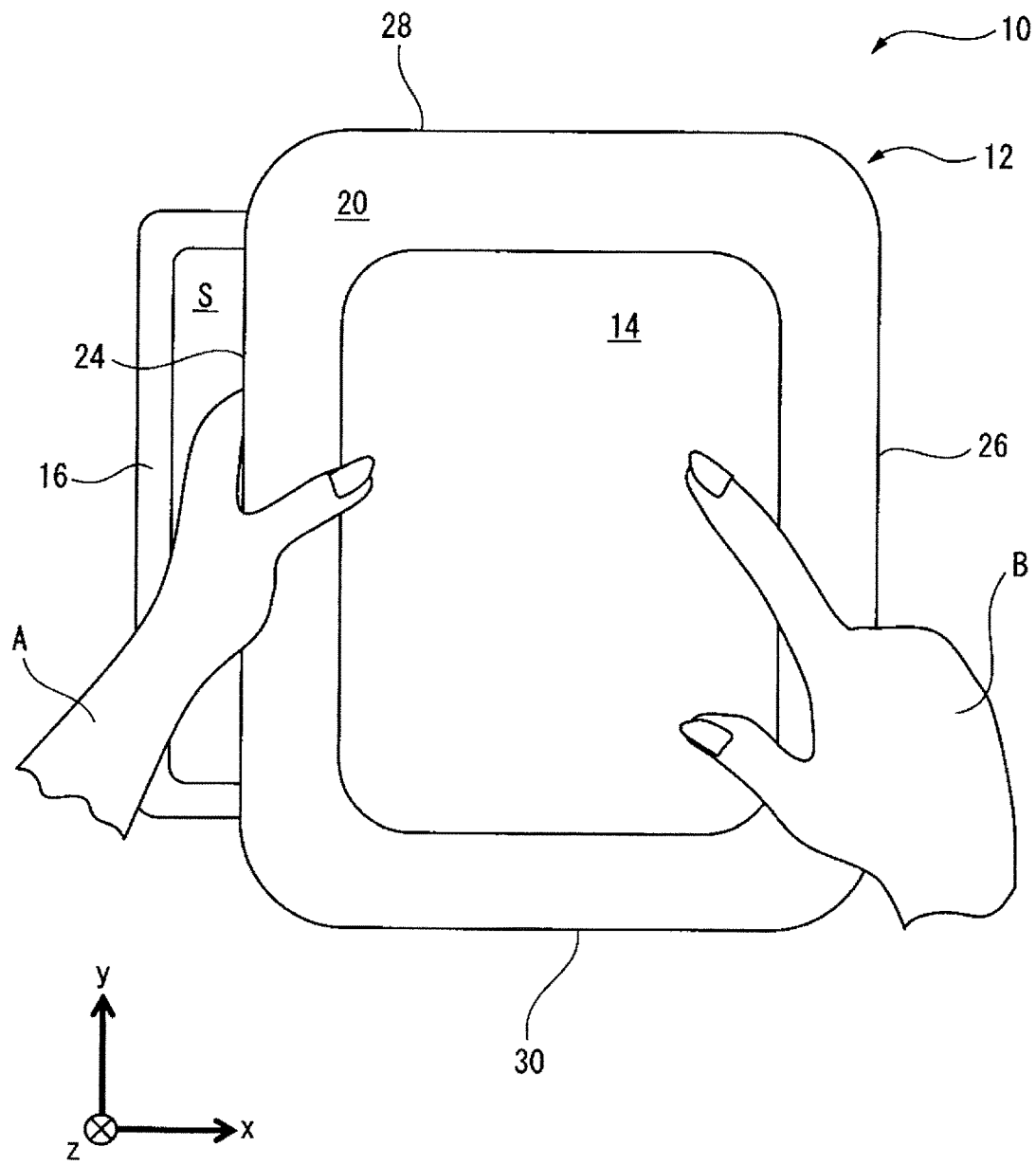
FIG. 7 illustrates a typical example of a use in which a right-handed user uses the robot teaching device illustrated in FIG. 1.
Figure 8:
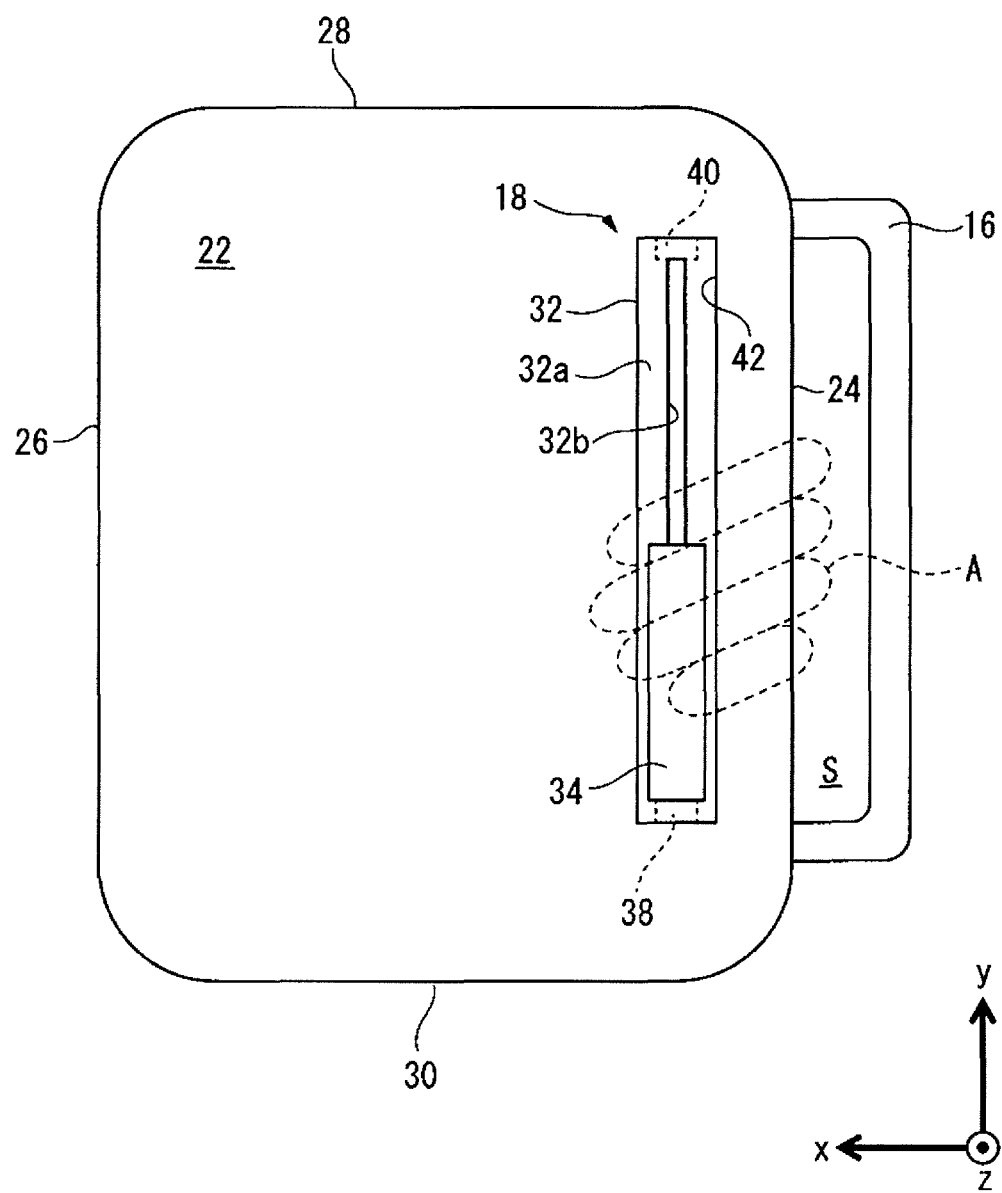
FIG. 8 is a rear view of the robot teaching device illustrated in FIG. 7 and illustrates a left hand of the user holding a main body section by a dotted line.

Next, with reference to FIGS. 7 and 8, a typical, example in a case where a right-handed user uses the robot teaching device 10 is described. Note that, in FIG. 8, a left hand A of the user is indicated by a dotted line for easy understanding.

For use by a right-handed user, the moving portion 34 of the enable switch operating section 18 is arranged at the first end (the end in the y-axis negative direction) of the movement stroke thereof. The right-handed user typically holds the side surface 24 of the main body 12 of the robot teaching device 10 with the left hand A, and operates the robot teaching device 10 (e.g., the hard key or touch sensor) with a right hand B. Thus, the side surface 24 according to this embodiment constitutes a holding portion held by the user with the left hand.

At this time, the user typically inserts an index finger, a middle finger, a ring finger, and a little finger of the left hand A into the space S defined by the hand guide 16 and places them on the back surface 22 of the main body 12, while a thumb is placed on the front surface 20 of the main body 12. In this way, the user holds the side surface 24 of the main body 12 with the left hand A, as illustrated in FIG. 7.

At this time, the user holds a reference position in the side surface 24 of the main body 12. This "reference position" is a position at which the user can easily hold the main body 12 ergonomically when the right-handed user holds the side surface 24 with the left hand A. For example, the reference position is a central position in the y-axis direction of the side surface 24 or a position slightly displaced from the central position in the y-axis negative direction. Note that, a holding guide having a concave or convex part for the hand A of the user to easily hold may be formed at the reference position in the side surface 24.

When the user holds the main body 12 with the left hand A as illustrated in FIG. 7, the moving portion 34 is arranged at the first end of the movement stroke thereof, therefore, at least one of the index finger, the middle finger, the ring finger, and the little finger of the left hand A is put on the moving portion 34 as illustrated in FIG. 8.

In other words, the first end of the movement stroke of the moving portion 34 is set such that at least one of the index finger, the middle finger, the ring finger, and the little finger of the left hand A is put on the moving portion 34 arranged at the first end when the user holds the reference position of the main body 12 with the left hand A.

Due to this, the user can hold the moving portion 34 with at least one of the index finger, the middle finger, the ring finger, and the little finger of the left hand A, and press the moving portion 34 in the z-axis negative direction by applying force thereto. When the user presses the moving portion 34 in the z-axis negative direction, the base 32 is displaced from the first switch position to the second switch position.

When the base 32 is arranged at the second switch position, the enable switch 17 is turned ON, thereby it is possible to teach and operate the robot through the robot teaching device 10 and the robot controller.

When the user further presses the moving portion 34 in the z-axis negative direction, the base 32 is displaced from the second switch position to the third switch position. When the base 32 is arranged at the third switch position, the enable switch 17 is turned OFF, thereby the motion of the robot is stopped.

On the other hand, when the user releases the fingers from the moving portion 34, the base 32 returns to the first switch position by the action of the spring 36. During the base 32 is arranged at the first switch position, the enable switch 17 is OFF, and the motion of the robot is stopped.

In such a manner, the motion of switching the position of the base 32 to the first switch position, the second switch position, or the third switch position by pressing the moving portion 34 with the left hand A or releasing the fingers therefrom while the right-handed user holds the reference position of the main body 12 with the left hand A is a reference switching motion of the enable switch.

This reference switching motion is that the user can consciously turn ON the enable switch 17, while he/she can unconsciously turn OFF the enable switch 17. In the present embodiment, the user can turn ON the enable switch 17 by holding and pressing the moving portion 34 by one level, while the user can turn OFF the enable switch 17 by strongly holding and pressing the moving portion 34 by two levels or releasing the fingers from the moving portion 34.

Figure 9:
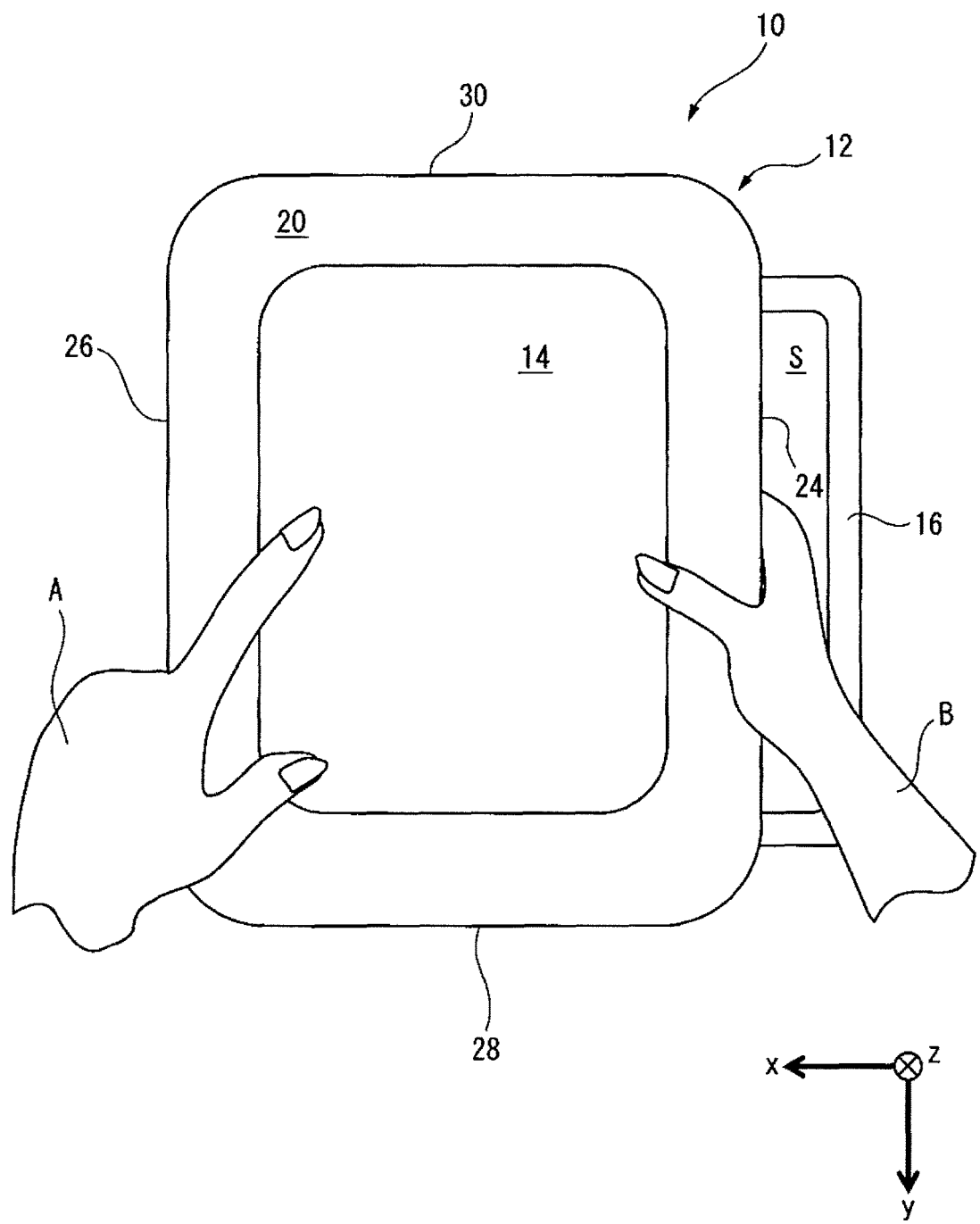
FIG. 9 illustrates a typical example of a use in which a left-handed user uses the main body section of the robot teaching device illustrated in FIG. 1.
Figure 10:
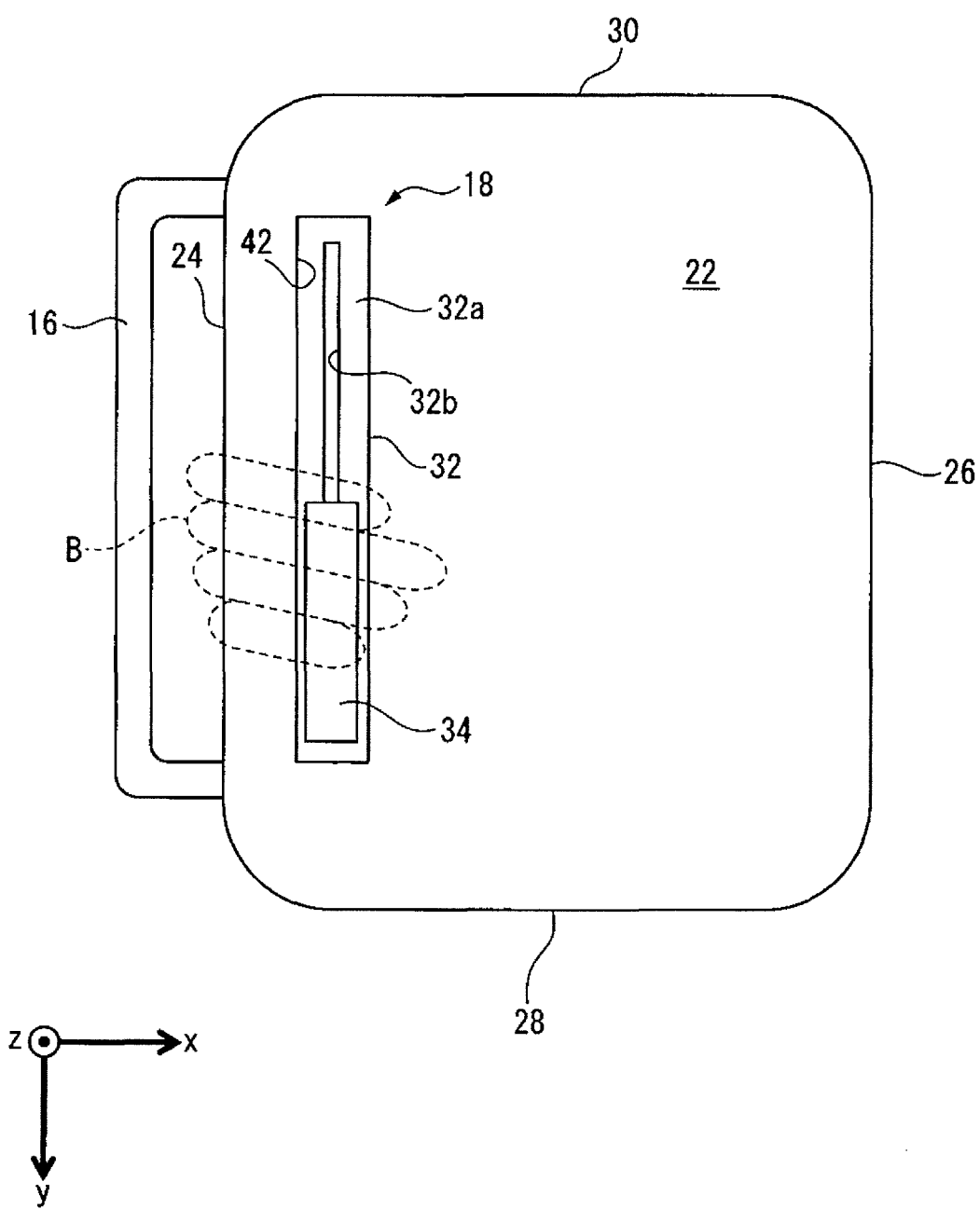
FIG. 10 is a rear view of the robot teaching device illustrated in FIG. 9 and illustrates a right hand of the user holding the main body section by a dotted line.

Next, with reference to FIGS. 9 and 10, a typical example in which a left-handed user uses the robot teaching device 10 is described. Note that, FIG. 10 illustrates a right hand B of the user by a dotted line for easy understanding.

For use by a left-handed user, the moving portion 34 of the enable switch operating section 18 is arranged at the second end (end in the y-axis positive direction) of the movement stroke thereof. The left-handed user typically holds the main body 12 of the robot teaching device 10 with the right hand B, and operates the robot teaching device 10 (e.g., a hard key or touch sensor) with the left hand A.

Therefore, the left-handed user rotates the robot teaching device 10 illustrated in FIG. 7, that shows the use of the right-handed user, by 180° about the z-axis in FIG. 7. In response to this rotation, the robot teaching device 10 may automatically rotate an image displayed on the display 14 by 180°.

Then, the user inserts an index finger, a middle finger, a ring finger, and a little finger of the right hand B into the space S defined by the hand guide 16 and places them on the back surface 22 of the main body 12, while a thumb is placed on the front surface 20 of the main body 12. As a result, the user holds the side surface 24 of the main body 12 as illustrated in FIGS. 9 and 10.

At this time, the user holds a reference position of the side surface 24 of the main body 12. This "reference position" is a position that allows the user to easily hold the main body 12 ergonomically when the left-handed user holds the side surface 24 with the right hand B. The reference position in this case is e.g. a central position in the y-axis direction of the side surface 24 or a position slightly displaced from the central position in the y-axis positive direction. Note that, a holding guide having a concave or convex part for the hand B of the user to easily hold may be formed at the reference position in the side surface 24.

When the user holds the main body 12 with the right hand B as illustrated in FIG. 9, the moving portion 34 is arranged at the second end of the movement stroke, therefore, at least one of the index finger, the middle finger, the ring finger, and the little finger of the right hand B is put on the moving portion 34 as illustrated in FIG. 10.

In other words, the second end of the movement stroke of the moving portion 34 is set such that at least one of the index finger, the middle finger, the ring finger, and the little finger of the right hand B is put on the moving portion 34 arranged at the second end when the user holds the reference position of the main body 12 with the right hand B.

Due to this, the user can hold the moving portion 34 with at least one of the index finger, the middle finger, the ring finger, and the little finger of the right hand B and apply force thereto to press the base 32 in the z-axis negative direction by two levels, in order to arrange the base 32 in the second switch position or the third switch position. Further, the user can return the pressed base 32 to the first switch position by releasing the fingers of the right hand B from the moving portion 34.

In such a manner, the motion of switching the position of the base 32 to the first switch position, the second switch position, or the third switch position by pressing the moving portion 34 with the right hand B or releasing the fingers therefrom while the left-handed user holds the reference position of the main body 12 with the right hand B is a reference switching motion of the enable switch.

Thus, in this embodiment, due to the moving portion 34 movable with respect to the base 32, both a right-handed user and a left-handed user can carry out the reference switching motion more easily than another motion (i.e., a motion of pressing a portion other than the moving portion 34) when the user holds the reference position of the main body 12 with his/her hand. Therefore, the moving portion 34 functions as a switching motion specifying mechanism configured to facilitate the reference switching motion.

Due to this configuration, simply by moving the moving portion 34 according to user's dominant hand, the user can hold the moving portion 34 of the enable switch operating section 18 with the finger and reliably operate it when the user holds the main body 12 with any of the left hand A and the right hand B.

Further, it is possible to adapt to both uses for the right-handed and left-handed users by a single enable switch operating section 18, therefore, the number of parts and heat generation due to the enable switch can be reduced when compared with a case where two enable switches are provided for the right-hand and the left-hand users.

In this embodiment, the moving portion 34 is provided to be slidable on the end face 32a of the base 32 by the engagement structures between the rail 34b and the recess 32b. According to this configuration, the moving portion 34 can be smoothly moved in the y-axis direction while preventing the moving portion 34 from falling off the base 32.

Note that, the base 32 may be provided in the main body 12 such that the end face 32a of the base 32 is placed at a position displaced in the z-axis positive direction from the back surface 22 of the main body 12. Further, a holding guide having a concave or convex part for the hand A or B of the user to easily hold may be formed at both side surfaces in the x-axis direction of the moving portion 34.

Next, a robot teaching device 50 according to another embodiment will be described below with reference to FIGS. 11 and 12. The robot teaching device 50 differs from the above-described robot teaching device 10 in an enable switch operating section 52.

Figure 12:
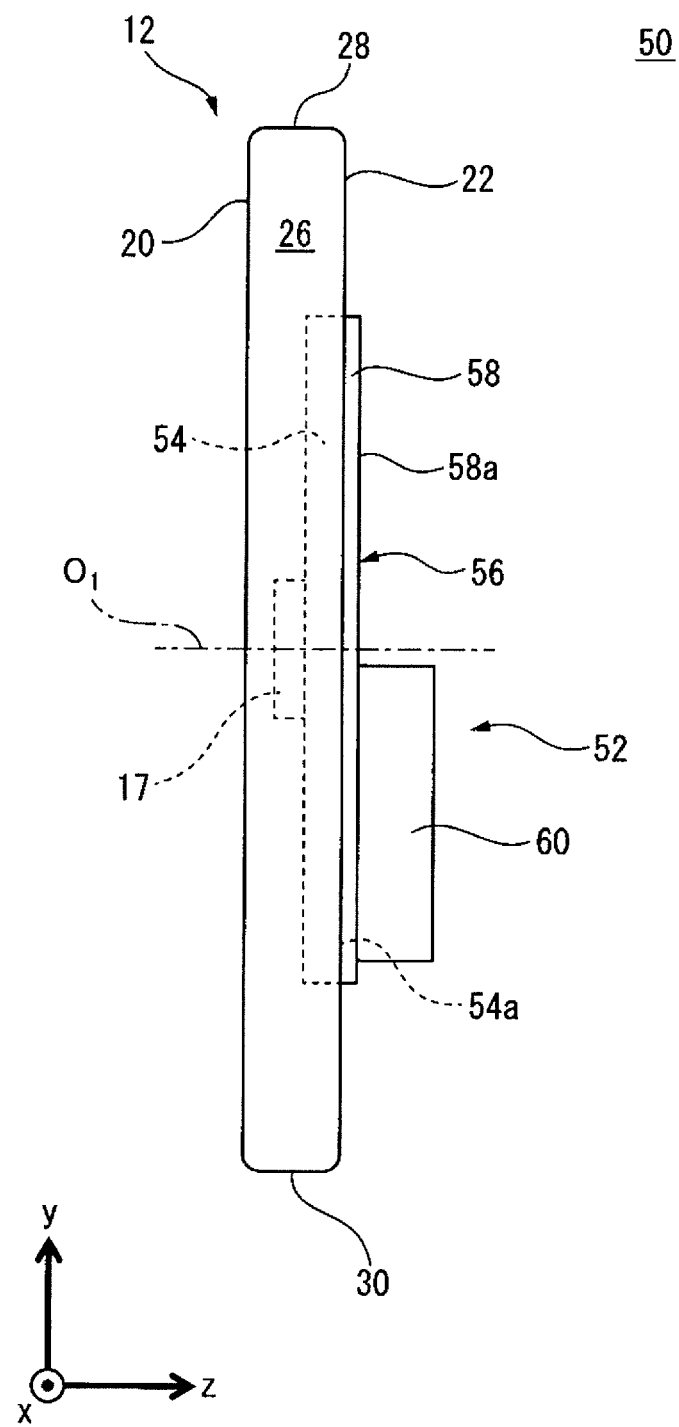
FIG. 12 is a side view of the robot teaching device illustrated in FIG. 11.

Specifically, as illustrated in FIG. 12, the enable switch operating section 52 includes a base 54 and a moving portion 56. The base 54 is provided in the main body 12 such that an end face 54a in the z-axis positive direction thereof is arranged at a position in the z-axis direction substantially the same as the back surface 22 of the main body 12, or a position slightly displaced in the z-axis positive direction from the back surface 22.

The base 54 is received in the hole 42 formed at the main body 12 so as to be pressed by two levels in the z-axis negative direction, similarly to the above-described base 32. Specifically, the base 54 can be pressed by the two levels from a first switch position where the enable switch 17 turns OFF to a second switch position where the enable switch 17 turns ON, and to a third switch position where the enable switch 17 turns OFF.

The moving portion 56 is provided on the end face 54a of the base 54 so as to be rotatable about an axis $O_1$. The axis $O_1$ is arranged at the center of the end face 54a, is parallel to the z-axis, and is orthogonal to the end face 54a of the base 54.

The moving portion 56 includes a first portion 58 and a second portion 60. The first portion 58 has the same external shape as the hole 42 and the base 54 as seen from the z-axis direction. The first portion 58 is an elongated cuboid member that extends in the y-axis direction.

The second portion 60 is fixed integrally to the first portion 58 so as to protrude in the z-axis positive direction from an end face 58a in the z-axis positive direction of the first portion 58. The second portion 60 is a cuboid member having a dimension in the z-axis direction greater than that of the first portion 58, and dimensions in the x-axis and the y-axis directions smaller than those of the first portion 58.

Figure 11:
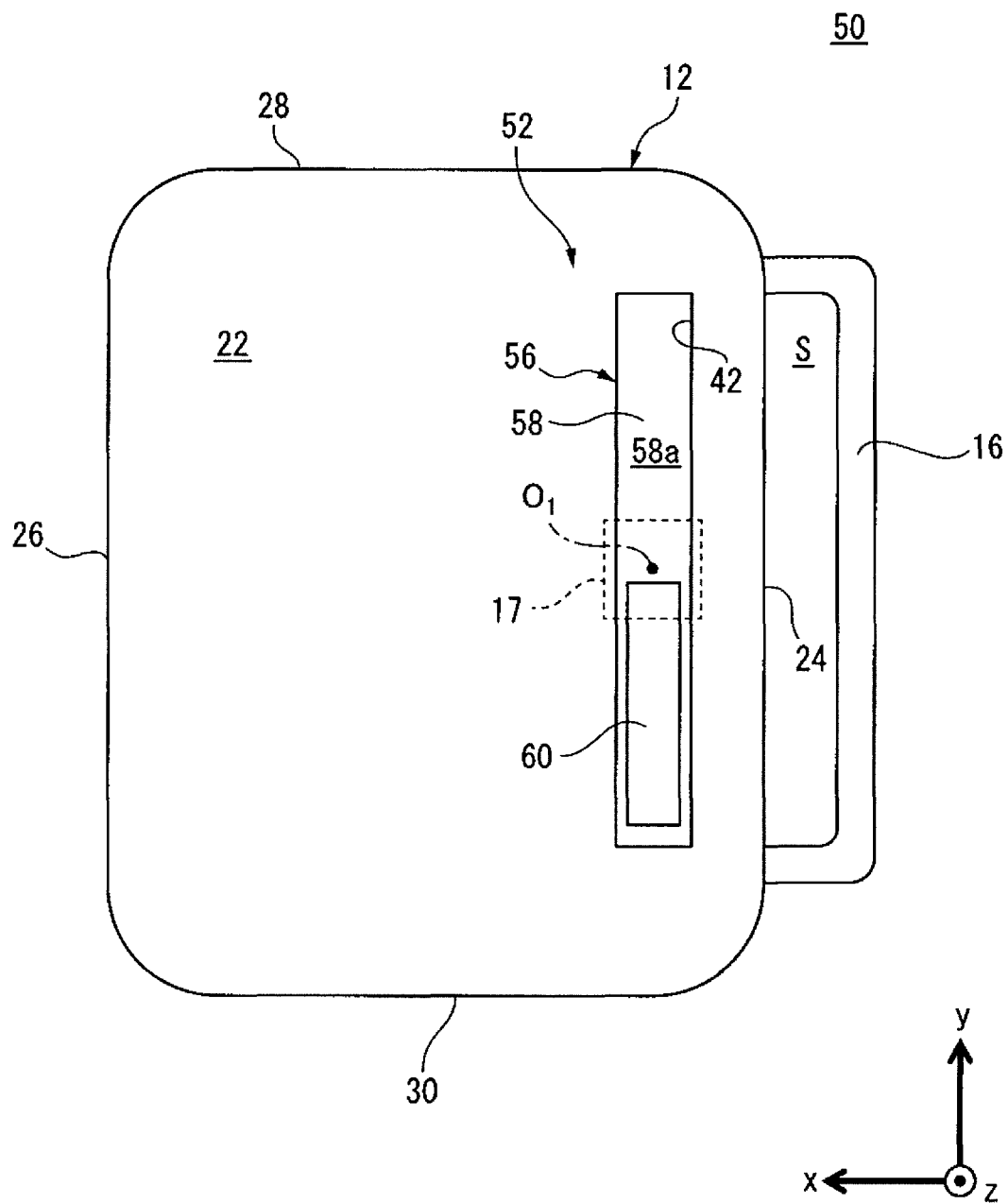
FIG. 11 is a rear view of a robot teaching device according to another embodiment.

Next, with reference to FIGS. 11 and 12, a typical example in which a right-handed user uses the robot teaching device 50 according to this embodiment is described. For use by a right-handed user, the moving portion 56 of the enable switch operating section 52 is arranged at a position (first position) illustrated in FIGS. 11 and 12 with respect to the base 54. Note that, the enable switch operating section 52 may include the position retaining mechanism 38 or 40 described above, wherein the position retaining mechanism 38 or 40 may retain the moving portion 56 when the moving portion 56 is arranged at the first position.

When the moving portion 56 is arranged at the first position, the second portion 60 of the moving portion 56 is arranged at the y-axis negative direction side of the axis $O_1$. Due to this, when the right-handed user holds the reference position of the main body 12 with the left hand A as illustrated in FIG. 1, at least one of the index finger, the middle finger, the ring finger, and the little finger of the left hand A is put on the second portion 60.

Therefore, the user can hold the second portion 60 with at least one of the index finger, the middle finger, the ring finger, and the little finger of the left hand A, and can carry out the reference switching motion to apply force to the second portion 60 in the z-axis negative direction so as to press the base 54 to the second and third switch positions, and release the fingers from the second portion 60 so as to return the base 54 to the first switch position.

Figure 13:
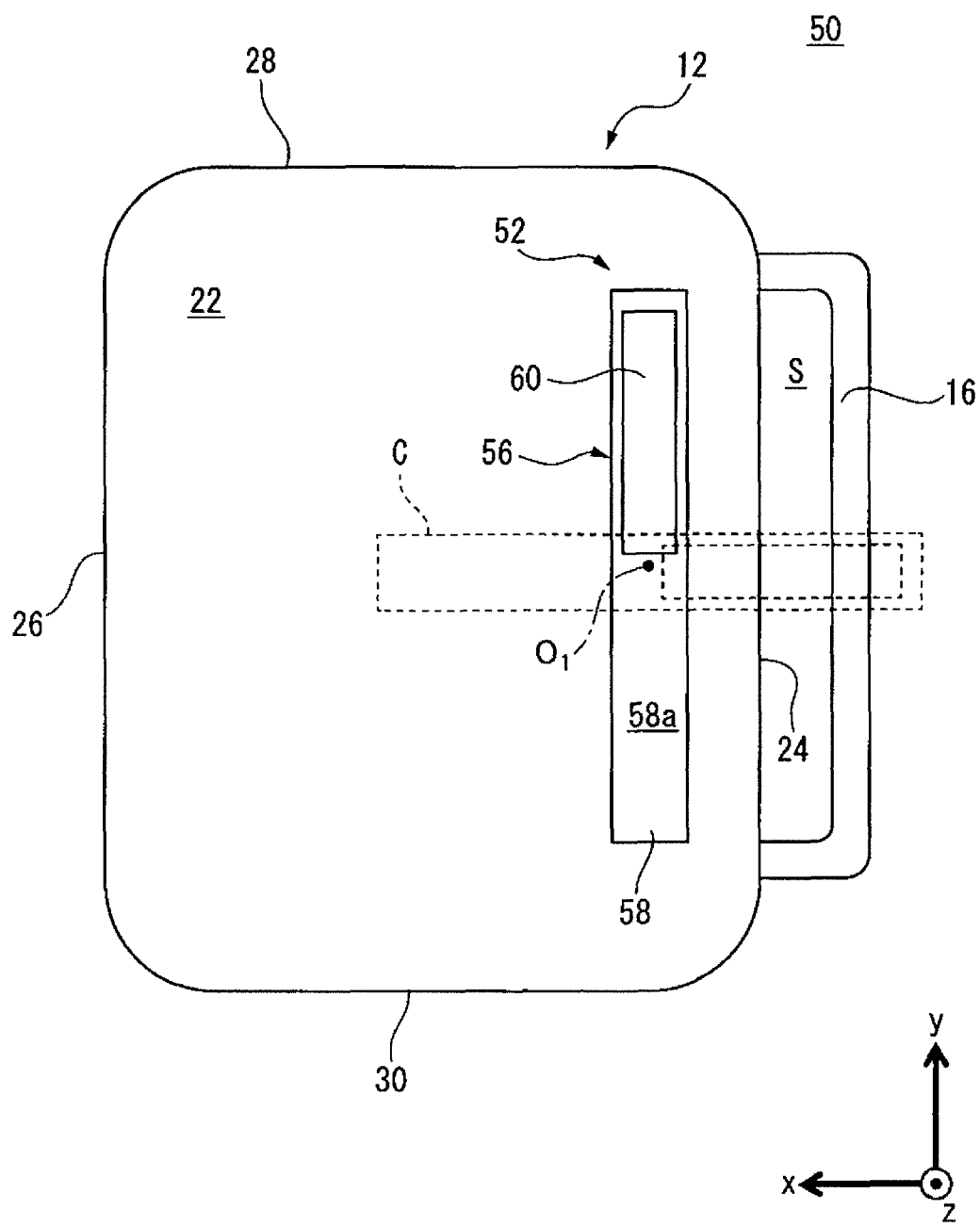
FIG. 13 illustrates a state where a moving portion of an enable switch illustrated in FIG. 11 is rotated.

Next, with reference to FIGS. 11 and 13, a typical example in which a left-handed user uses the robot teaching device 50 is described. For use by a left-handed user, the moving portion 56 of the enable switch operating section 52 is rotated about the axis $O_1$ by 180° from the position illustrated in FIG. 11, and thereby is arranged at a position (second position) illustrated in FIG. 13.

Note that, the enable switch operating section 52 may include the above-described position retaining mechanism 38 or 40, wherein the position retaining mechanism 38 or 40 may retain the moving portion 56 when the moving portion 56 is arranged at the second position. As a result, the second portion 60 of the moving portion 56 is arranged at the y-axis positive direction side of the axis $O_1$. Note that, a dotted line C in FIG. 13 illustrates the moving portion 56 during rotation.

Due to this, when the left-handed user holds the reference position of the main body 12 with the right hand 16 as illustrated in FIG. 9, at least one of the index finger, the middle finger, the ring finger, and the little finger of the right hand B is put on the second portion 60.

Therefore, the user can hold the second portion 60 with at least one of the index finger, the middle finger, the ring finger, and the little finger of the right hand B, and can carry out a reference motion to apply force to the second portion 60 so as to press the base 54 to the second and third switch positions, and release the fingers from the second portion 60 so as to return the base 54 to the first switch position.

Thus, in this embodiment, the moving portion 56 rotatable with respect to the base 54 allows both a right-handed user and a left-handed user to carry out the reference switching motion more easily than another motion (i.e., a motion of pressing a portion other than the second portion 60), when the user holds the reference position of the main body 12 with his/her hand. Therefore, the moving portion 56 functions as a switching motion specifying mechanism configured to facilitate the reference switching motion.

Due to this configuration, simply by rotating the moving portion 56 according to his/her dominant hand, the user can hold the second portion 60 of the enable switch operating section 52 with his/her fingers to reliably carry out the reference switching motion when the user holds the main body 12 with any of the left hand A and the right hand B.

Further, it is possible to adapt to both uses for the right-handed and left-handed users by a single enable switch operating section 52, therefore, the number of parts and heat generation due to the enable switch can be reduced when compared with a case where two enable switches are provided for the right-hand and the left-hand users.

In this embodiment, the moving portion 56 is provided at the base 54 so as to be rotatable. According to this configuration, it is possible to relatively move the second portion 60 in the y-axis direction by a simple operation to rotate the moving portion 56.

Next, a robot teaching device 70 according to still another embodiment will be described below with reference to FIGS. 14 and 15. The robot teaching device 70 differs from the above-described robot teaching device 10 in an enable switch operating section 72.

Specifically, the enable switch operating section 72 includes a base 74, a shaft 78, and urging parts 80. The base 74 is received in a hole 42' formed in the main body 12 so as to be rotatable about an axis $O_2$.

The axis $O_2$ extends in the y-axis direction so as to be parallel to the side surface 24 of the main body 12. The base 74 is a cylindrical member extending in the y-axis direction, wherein a through hole 74a penetrating the base 74 in the y-axis direction is formed at the center of the base 74.

A protrusion 76 is formed at the base 74. The protrusion 76 protrudes from an outer peripheral surface 74b of the base 74 to radially outside of the base 74, and extends in the y-axis direction. Specifically, the protrusion 76 includes side surfaces 76a and 76b extending from the outer peripheral surface 74b to radially outside and extending in the y-axis direction so as to be opposite to each other, and an end face 76c extending between the side surface 76a and the side surface 76b and extending in the y-axis direction.

The shaft 78 is inserted into the through hole 74a. The shaft 78 is fixed to the main body 12 at both ends in the axis direction of the shaft 78. The base 74 is rotatable with respect to the shaft 78. The shaft 78 retains the base 74 such that the base 74 is rotatable about the axis $O_2$.

The urging parts 80 are respectively arranged at both ends in the y-axis direction of the base 74. Each of the urging part 80 is e.g. a torsion spring. When the base 74 is rotated about the axis $O_2$ from a neutral position (first rotation position) illustrated in FIG. 15, the urging parts 80 urges the base 74 toward the neutral position.

Figure 15:
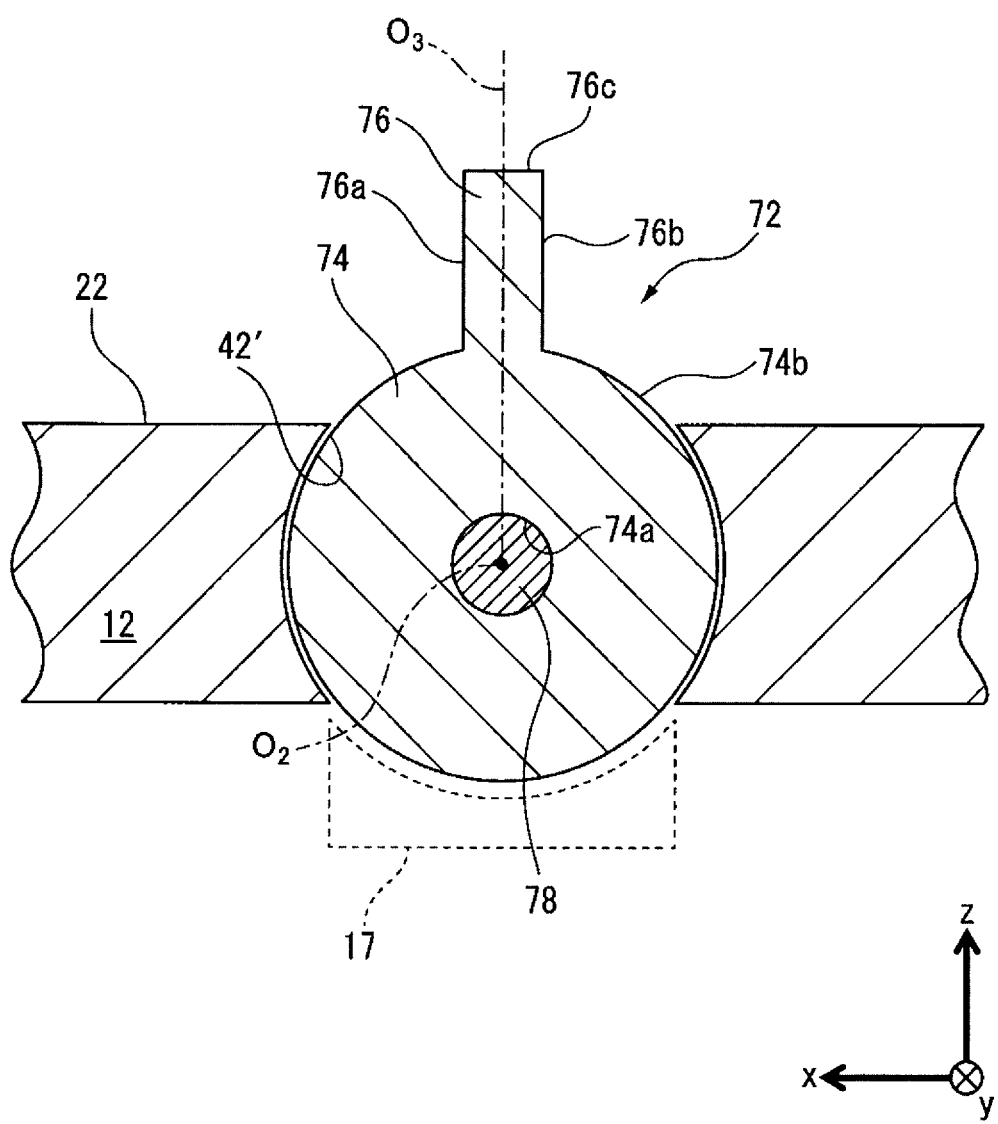
FIG. 15 is a cross-sectional view taken along XV-XV in FIG. 14.

When the base 74 is arranged at the neutral position, as illustrated in FIG. 15, a virtual line $O_3$ extending in the z-axis positive direction from the axis $O_2$ is substantially parallel to the side surfaces 76a and 76b of the protrusion 76 and is substantially orthogonal to the end face 76c.

The base 74 according to this embodiment turns the enable switch 17 ON or OFF according to its rotation angle about the axis $O_2$. This function will be described below.

Figure 14:
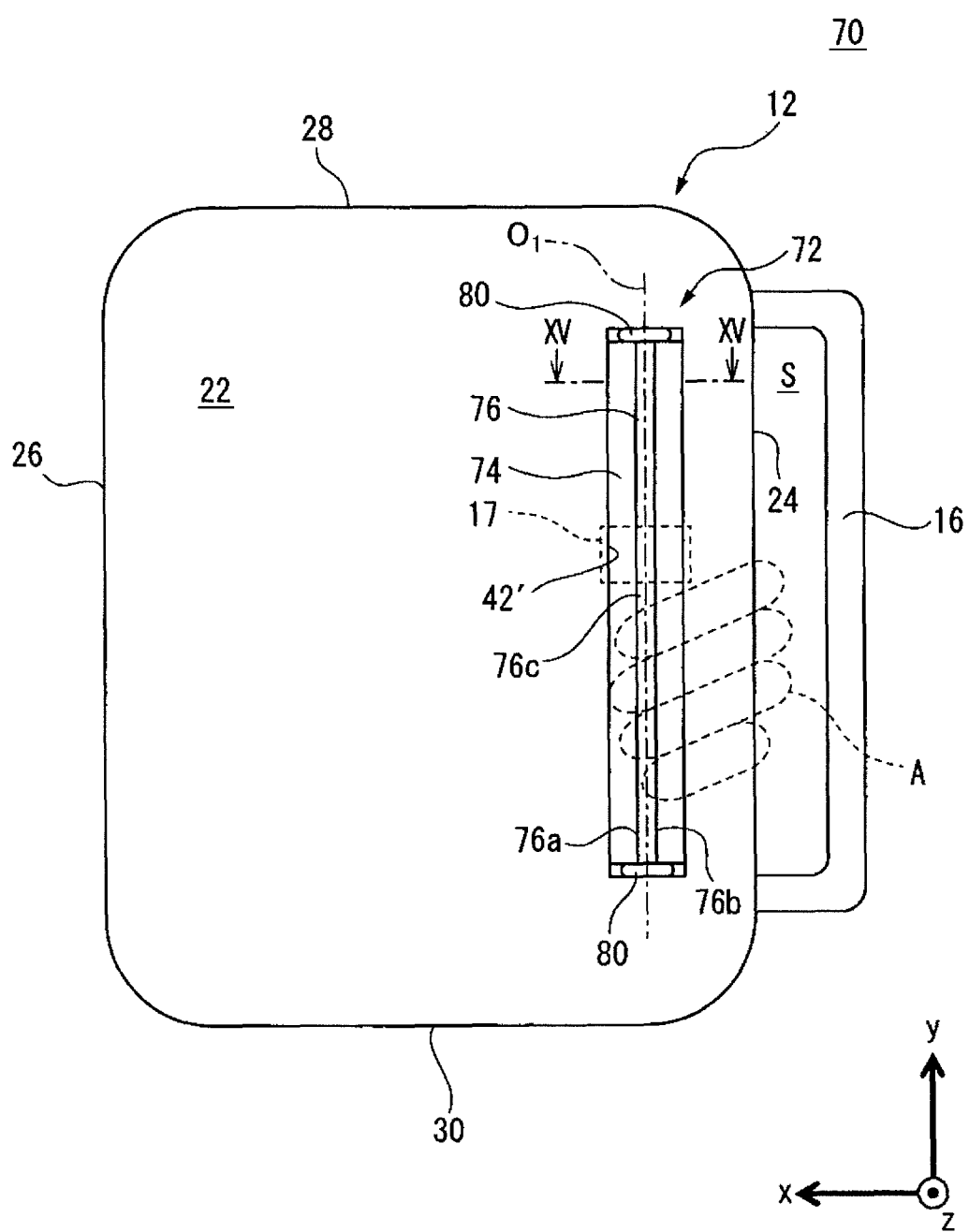
FIG. 14 is a rear view of a robot teaching device according to still another embodiment and illustrates a left hand of a user holding a main body section by a dotted line.
Figure 16:
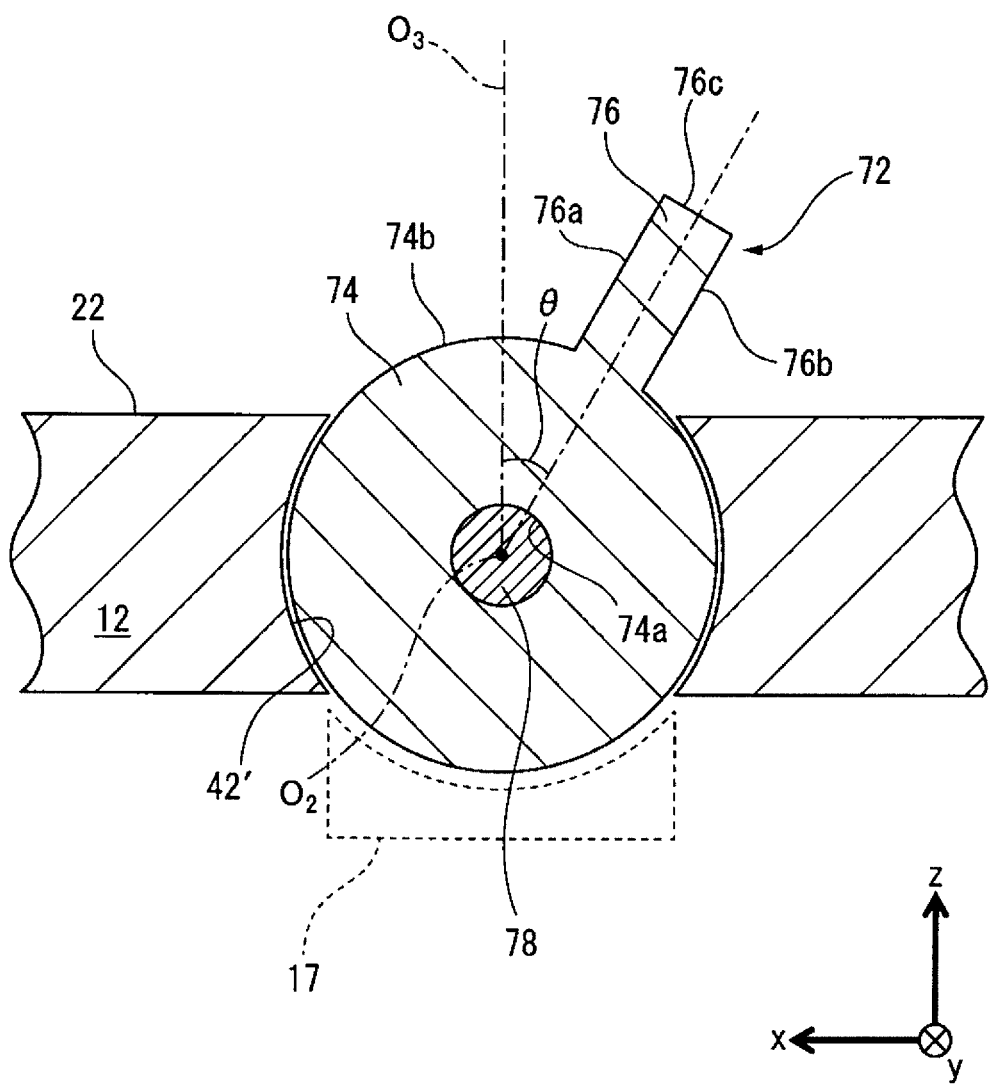
FIG. 16 illustrates a state where an enable switch illustrated in FIG. 15 is rotated.

Next, with reference to FIGS. 14 to 16, a typical example in which a right-handed user uses the robot teaching device 70 is described. For use by a right-handed user, the user typically holds the reference position of the main body 12 with the left hand A as illustrated in FIG. 7.

At this time, as illustrated in FIG. 14, at least one of the index finger, the middle finger, the ring finger, and the little finger of the left hand A is put on the side surface 76a and the end face 76c of the protrusion 76 provided on the base 74 at back surface side of the main body 12.

Thereby, the user can hold the protrusion 76 with at least one of the index finger, the middle finger, the ring finger, and the little finger of the left hand A, and apply force to the protrusion 76 so as to rotate the base 74 in the clockwise direction as seen from the y-axis negative direction side (i.e., the front side of FIG. 15). As a result, the base 74 is rotated clockwise from the neutral position illustrated in FIG. 15 by an angle θ as seen from the y-axis negative direction side, as illustrated in FIG. 16.

When the rotation angle θ of the base 74 is in a range of equal to or greater than a first threshold value $θ_1$ (e.g., 15°) and equal to or less than a second threshold value $θ_2$ (e.g., 30°) (i.e., the range: $θ_1 ≤ θ ≤ θ_2$), the enable switch 17 is turned ON, and it is possible to teach and operate the robot through the robot teaching device 10 and the robot controller.

On the other hand, when the rotation angle θ of the base 74 exceeds the second threshold value $θ_2$ ($θ>θ_2$), the enable switch 17 is turned OFF, thereby the motion of the robot is stopped.

When the user then releases his/her fingers from the base 74, the base 74 returns to the neutral position illustrated in FIG. 15 by the action of the urging parts 80, thereby the rotation angle θ of the base 74 is smaller than the first threshold value $θ_1$. When the rotation angle θ of the base 74 is smaller than the first threshold value $θ_1$ ($θ<θ_1$), the enable switch 17 is turned OFF, and the motion of the robot is stopped.

Thus, in this embodiment, the motion of switching ON and OFF of the enable switch 17 by holding the protrusion 76 with the left hand A or releasing the fingers from the protrusion 76 while the right-handed user holds the reference position of the main body 12 with the left hand A so as to rotate the base 74 is a reference switching motion.

Note that, various configurations can be employed to turns ON the enable switch 17 only when the rotation angle θ of the base 74 is in the predetermined range ($θ_1≤θ≤θ_2$).

For example, the enable switch 17 includes a movable contact provided on the outer peripheral surface 74b of the base 74, and a fixed contact provided at the main body 12 so as to be in conductive contact with the movable contact when the base 74 is rotated in the range of $θ_1≤θ≤θ_2$. Due to such a configuration, the movable contact and the fixed contact can be electrically connected to each other, and thereby the enable switch 17 can be turned ON, only when the rotation angle θ of the base 74 is in the predetermined range ($θ_1$ $θ≤θ_2$).

Alternatively, a sensor (e.g., an encoder) that detects the rotation angle θ of the base 74 may be provided at the main body 12, wherein the enable switch 17 may be turned ON and OFF by electronic control such that the enable switch 17 is turned ON only when the detected rotation angle θ is in the predetermined range ($θ_1≤θ≤θ_2$).

Figure 17:
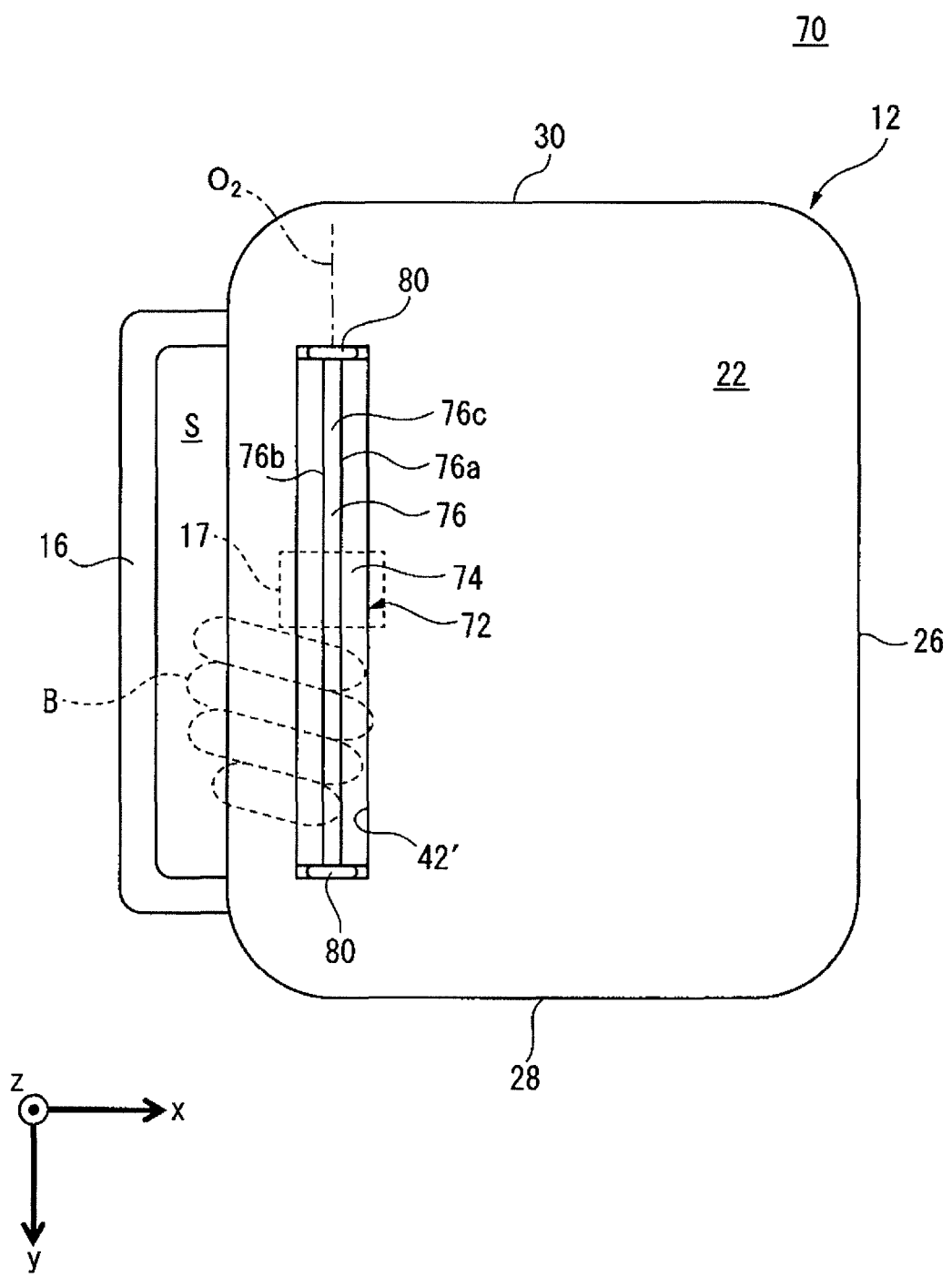
FIG. 17 is a rear view of the robot teaching device illustrated in FIG. 14 and illustrates a right hand of a user holding the main body section by a dotted line.

Next, with reference to FIGS. 16 and 17, a typical example in which a left-handed user uses the robot teaching device 70 is described. For use by a left-handed user, the user typically holds the reference position of the main body 12 with the right hand B as illustrated in FIG. 9.

At this time, as illustrated in FIG. 17, at least one of the index finger, the middle finger, the ring finger, and the little finger of the right hand B is put on the side surface 76a and the end face 76c of the protrusion 76 provided at the base 74 at the back surface side of the main body 12.

Thus, the user can hold the protrusion 76 with at least one of the index finger, the middle finger, the ring finger, and the little finger of the left hand A, and apply force to the protrusion 76 so as to rotate the base 74 in the clockwise direction when seen from the y-axis negative direction side (i.e. the front side of FIG. 15). As a result, the base 74 is rotated clockwise from the neutral position illustrated in FIG. 15 by an angle θ when seen from the y-axis negative direction side, as illustrated in FIG. 16.

The enable switch 17 is turned ON when the rotation angle θ of the base 74 is in the range of $θ_1≤θ≤θ_2$, while the enable switch 17 is turned OFF when the rotation angle θ is $θ>θ_2$.

When the user releases the fingers from the base 74, the base 74 returns to the neutral position illustrated in FIG. 12 by the action of the urging part 80. When the rotation angle θ is smaller than the first threshold value $θ_1$ ($θ≤θ_1$), the enable switch 17 is turned OFF.

Thus, in this embodiment, due to the shaft 78 that supports the base 74 so as to be rotatable and the urging part 80 that urges the base 74 to the neutral position, both a right-handed user and a left-handed user can more easily carry out the reference switching motion when the user holds the reference position of the main body 12 with his/her hand. Therefore, the shaft 78 and the urging part 80 function as a switching motion specifying mechanism configured to facilitate the reference switching motion.

According to this configuration, the user can reliably rotate the base 74 with the fingers when the user holds the main body 12 with any of his/her left hand A and right hand B.

Further, it is possible to adapt to both uses for the right-handed and left-handed users by a single enable switch operating section 72, therefore, the number of parts and heat generation due to the enable switch can be reduced when compared with a case where two enable switches are provided for the right-hand and the left-hand users.

Next, a robot teaching device 90 according to still another embodiment will be described with reference to FIGS. 18 to 20. The robot teaching device 90 differs from the above-described robot teaching device 10 in an enable switch operating section 92.

Specifically, the enable switch operating section 92 includes a cover 94, a base 96, and the springs 36. The base 96 is received in the hole 42 formed on the back surface 22, and provided so as to be pressed by two levels in the z-axis negative direction. In this embodiment, the base 96 is a single elongated member extending in the y-axis direction. The springs 36 are built in the main body 12 and urges the base 96 in the z-axis positive direction.

The cover 94 is attached to the main body 12 so as to be slidable in the y-axis direction. As illustrated in FIG. 20, the cover 94 includes a top wall 98, a side wall 100, a side wall 102, a flange 104, and a flange 106. The top wall 98 is a substantially rectangular plate member extending in the y-axis direction, is located slightly away from an end face 96a of the base 96 in the z-axis positive direction, and is arranged to face the end face 96a.

The side walls 100 and 102 extend in the z-axis negative direction from both ends in the x-axis direction of the top wall 98, and extend in the y-axis direction so as to be opposite to each other. The side wall 100 is located slightly away from an end face 96b of the base 96 in the x-axis positive direction and arranged to face the end face 96b, while the side wall 102 is located slightly away from an end face 96c of the base 96 in the x-axis negative direction and arranged to face the end face 96c.

The flange 104 protrudes in the x-axis positive direction from an end in the z-axis negative direction of the side wall 100. The flange 106 protrudes in the x-axis negative direction from an end in the z-axis negative direction of the side wall 102.

Recesses 42a and 42b are formed at the opening of the hole 42 of the main body 12. The recess 42a is formed so as to be recessed in the x-axis positive direction from the side wall defining the hole 42, and slidably receives the flange 104. The flange 104 engages the recess 42a.

The recess 42b is formed so as to be recessed in the x-axis negative direction from the side wall defining the hole 42, and slidably receives the flange 106. The flange 106 engages the recess 42b.

Due to this structure, the cover 94 can slide in the y-axis direction on the back surface 22 of the main body 12 while preventing the cover 94 from falling off the main body 12 in the z-axis positive direction. The movement stroke of the cover 94 in the y-axis direction is defined by both ends in the y-axis direction of the recesses 42a and 42b.

Figure 18:
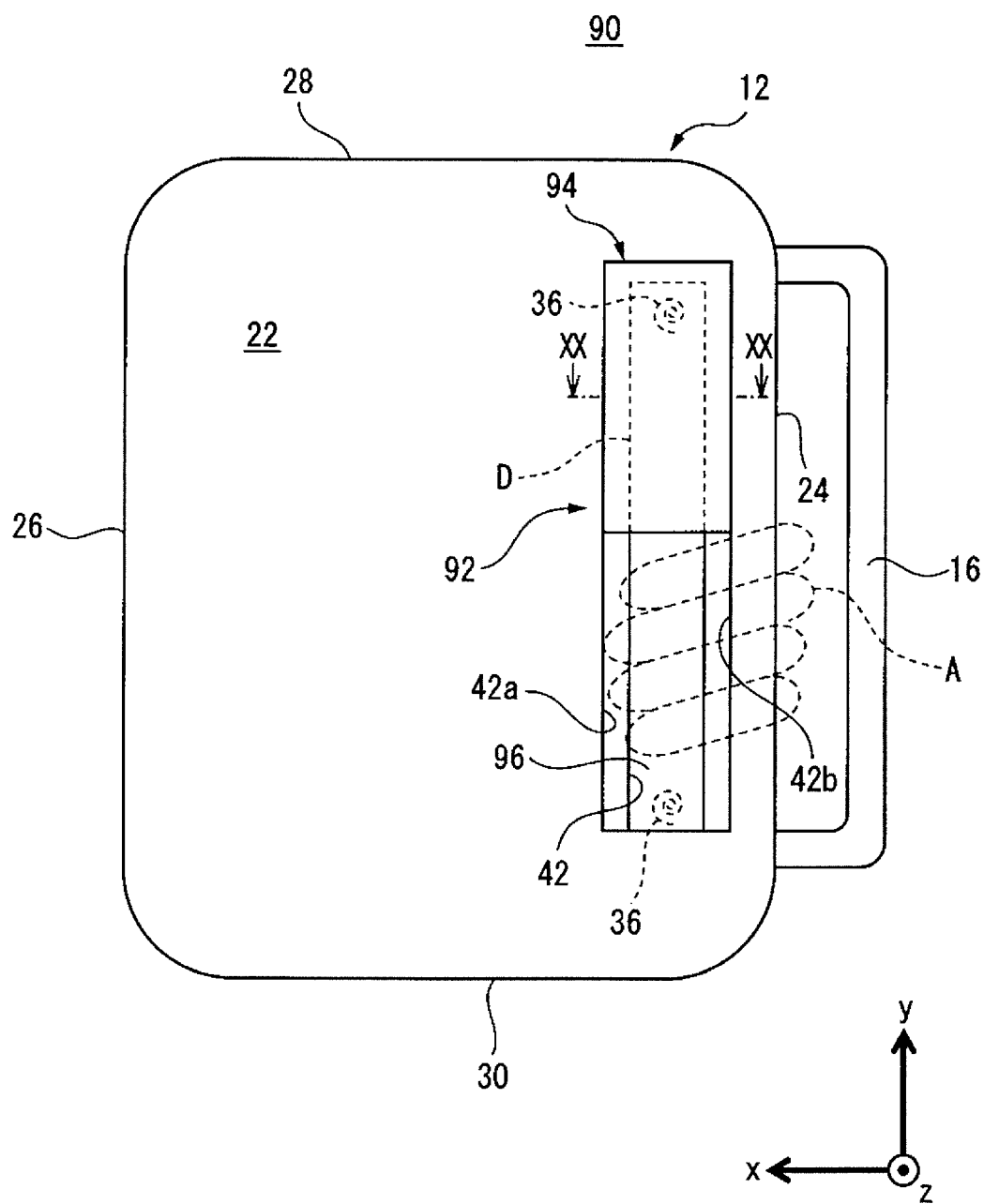
FIG. 18 is a rear view of a robot teaching device according to still another embodiment and illustrates a left hand of a user holding a main body section by a dotted line.

In FIG. 18, the cover 94 is arranged at a first end (i.e., an end in the y-axis positive direction. A first cover position) of the movement stroke thereof. At this time, the cover 94 covers a first portion D of the base 96 indicated by a dotted line D in FIG. 18 from the outside.

Figure 19:
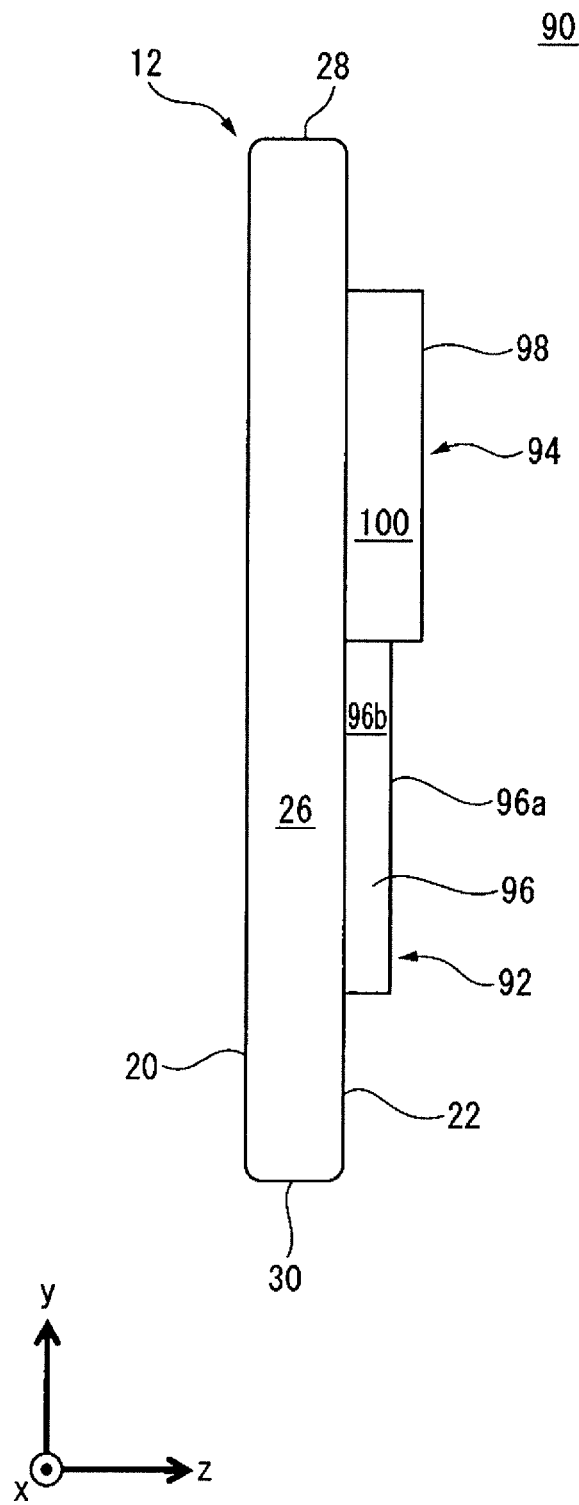
FIG. 19 is a side view of the robot teaching device illustrated in FIG. 18.
Figure 20:
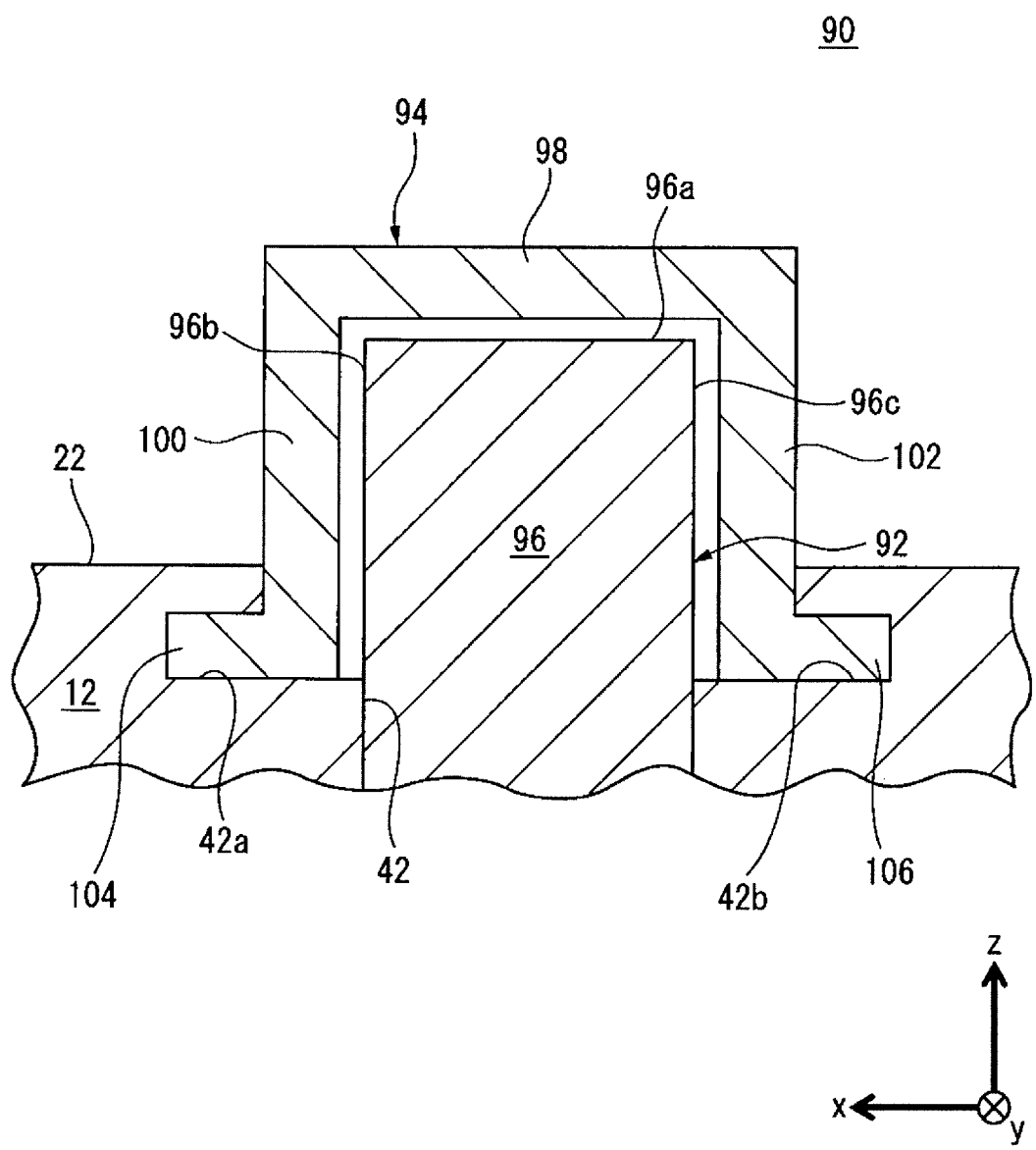
FIG. 20 is a cross-sectional view taken along XX-XX in FIG. 18.

When the right-handed user uses the robot teaching device 90 according to this embodiment, the user disposes the cover 94 at the first end of the movement stroke thereof as illustrated in FIGS. 18 and 19. The user then holds the reference position of the main body 12 with the left hand A, as illustrated in FIG. 7.

At this time, as illustrated in FIG. 18, at least one of the index finger, the middle finger, the ring finger, and the little finger of the left hand A is put on the base 96 at the back surface side of the main body 12. Thereby, the user can hold the base 96 with at least one of the index finger, the middle finger, the ring finger, and the little finger of the left hand A to carry out a reference switching motion of pressing the base 96 in the z-axis negative direction.

On the other hand, when the right-handed user uses the robot teaching device 90, the user moves the cover 94 from the position illustrated in FIG. 18 in the y-axis negative direction, and disposes the cover 94 at a second end (i.e., an end in the y-axis negative direction. A second cover position) of the movement stroke thereof. At this time, the cover 94 covers a second portion E of the base 96 of the enable switch operating section 92, that is indicated by a dotted line E in FIG. 21, from the outside. This second portion E is different from the first portion D.

Figure 21:
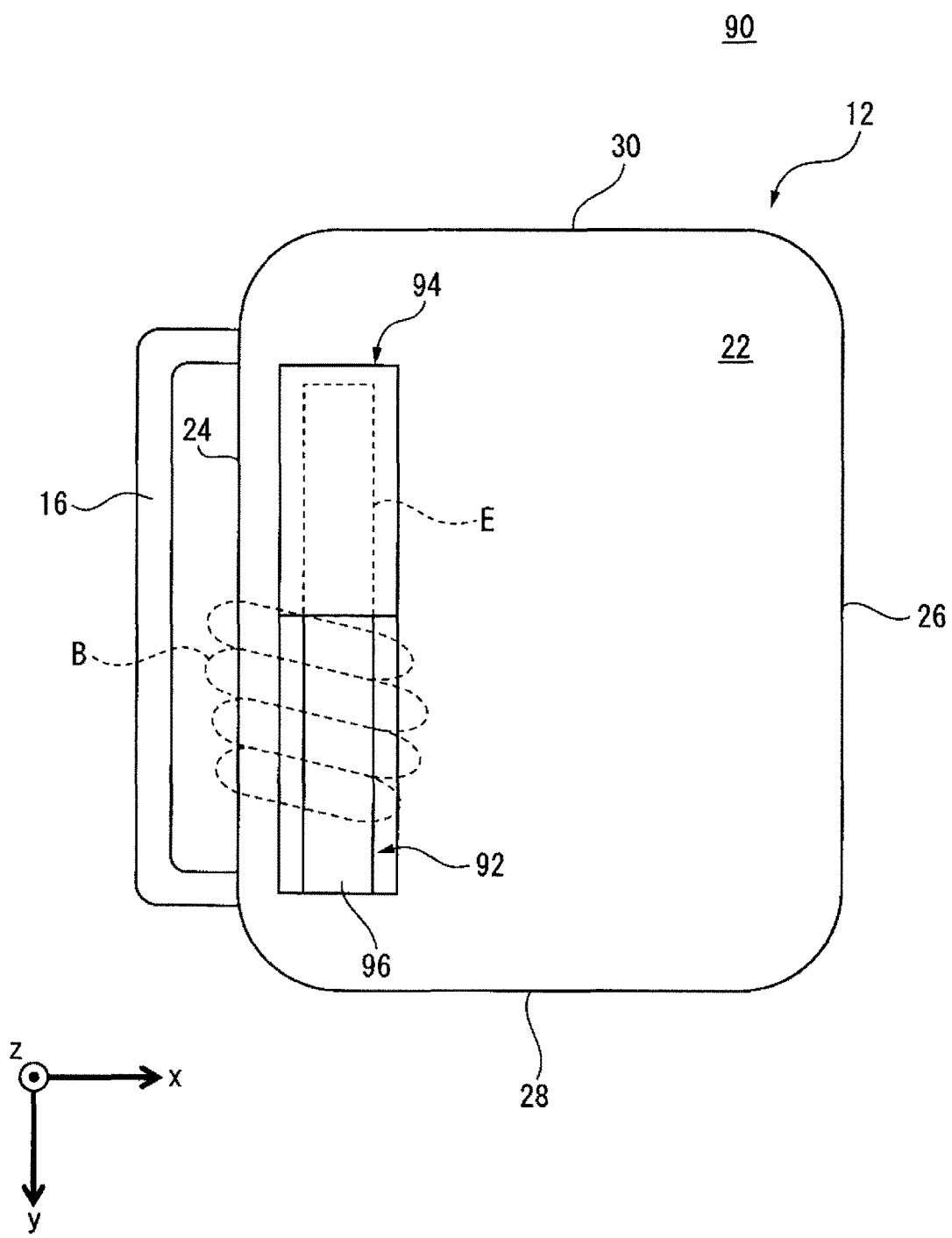
FIG. 21 is a rear view of the robot teaching device illustrated in FIG. 18 and illustrates a right, hand of a user holding the main body section by a dotted line.

The user then holds the reference position of the main body 12 with the right hand B as illustrated in FIG. 9. At this time, as illustrated in FIG. 21, at least one of the index finger, the middle finger, the ring finger, and the little finger of the right hand B is put on the base 96 of the enable switch operating section 92 at the back surface side of the main body 12. Thus, the user can hold the base 96 with at least one of the index finger, the middle finger, the ring finger, and the little finger of the left hand A to carry out a reference switching motion of pressing the base 96 in the z-axis negative direction.

Thus, in this embodiment, by disposing the cover 94 at the first end or the second end of the movement stroke, both a right-handed user and a left-handed user can more easily carry out the reference switching motion when the user holds the reference position of the main body 12 with his/her hand. Therefore, the cover 94 functions as a switching motion specifying mechanism configured to facilitate the reference switching motion.

According to this configuration, the user can carry out the reference switching motion on the base 96 by changing the position of the cover 94 depending on the user's dominant hand. Along with this, since the portion of the enable switch operating section 92, that is not to be touched by the user with his/her fingers during operation, can be covered by the cover 94, it is possible to prevent an external object outside of the robot teaching device 90 from accidentally contacting the enable switch operating section 92 so as to erroneously operate it.

Figure 22:
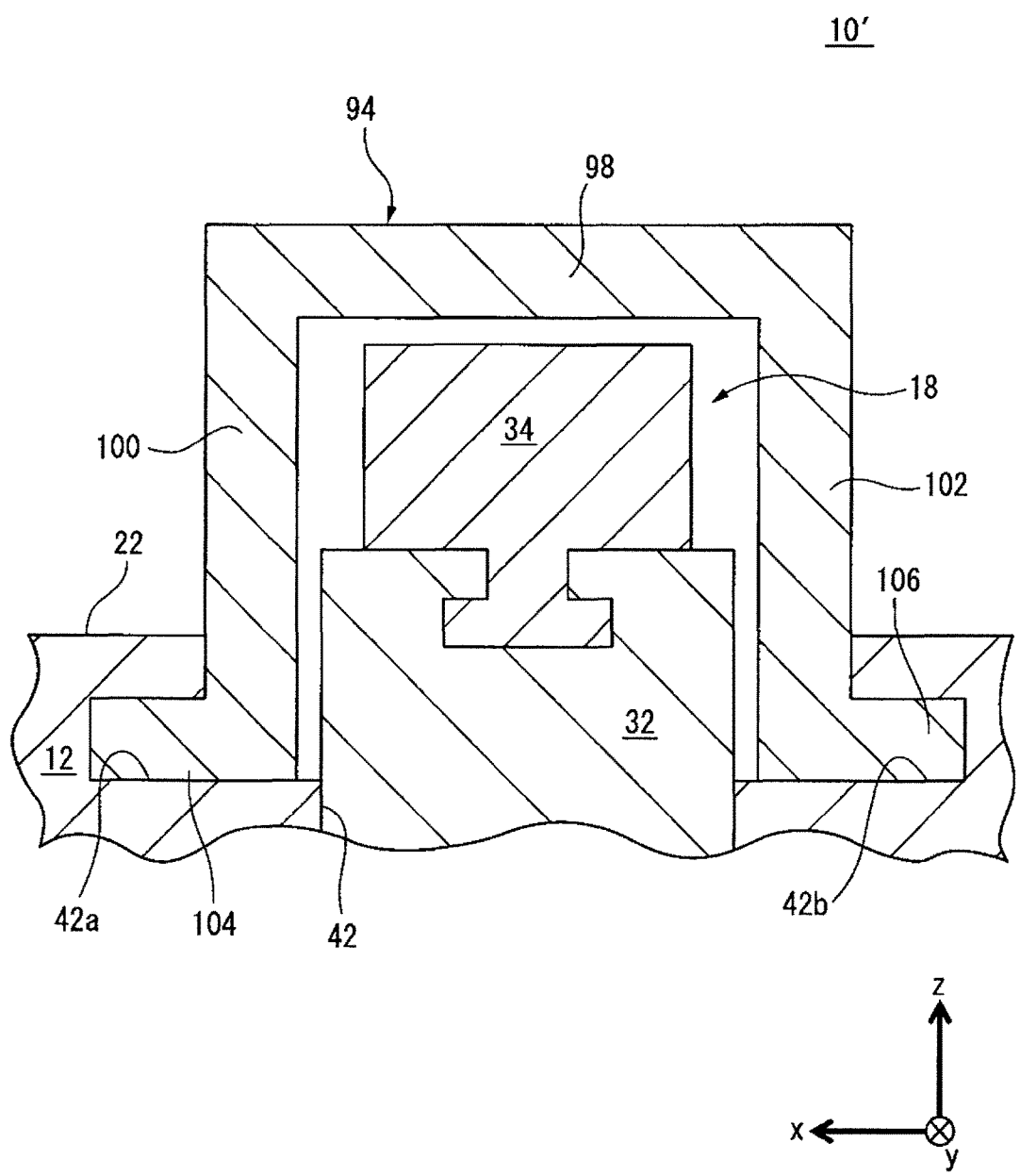
FIG. 22 is a cross-sectional view of main portions of a robot teaching device according to still another embodiment.
Figure 23:
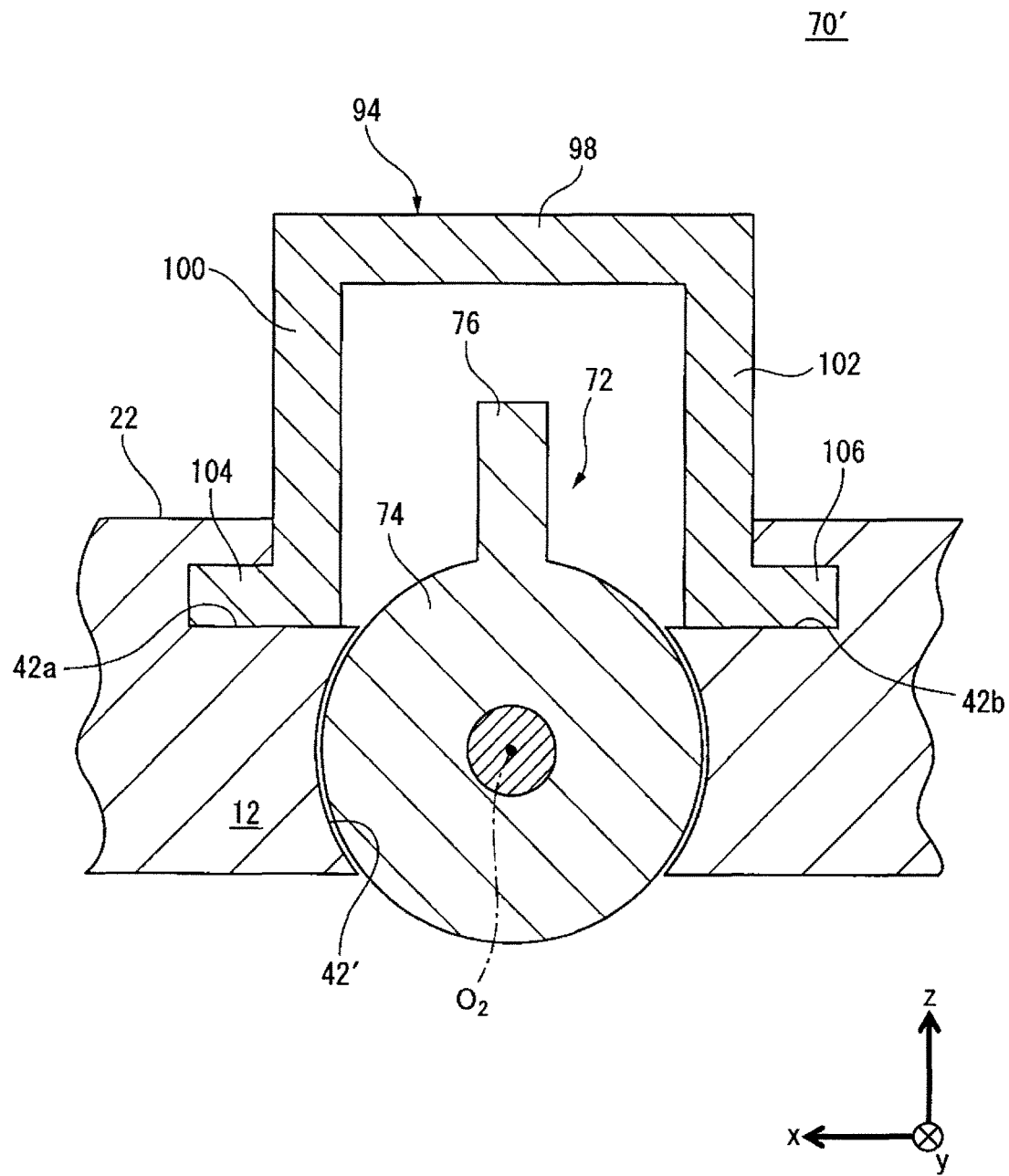
FIG. 23 is a cross-sectional view of main portions of a robot teaching device according to still another embodiment.

Note that, the cover 94 according to this embodiment is applicable to the robot teaching device 10, 50, or 70 described above. Such embodiments are illustrated in FIGS. 22 and 23. A robot teaching device 10' illustrated in FIG. 22 is an embodiment in which the cover 94 is applied to the above-described robot teaching device 10.

In the robot teaching device 10', the cover 94 is provided so as to be able to accommodate the moving portion 34 of the enable switch operating section 18. Upon the use of the robot teaching device 10', the cover 94 is arranged such that the moving portion 34 is exposed to the outside (i.e. the moving portion 34 is not covered by the cover 94).

For example, when a right-handed user uses the robot teaching device 10', the moving portion 34 is arranged at the first end (the end in the y-axis negative direction) of the stroke thereof as illustrated in FIG. 2, while the cover 94 is arranged at the first end (the end in the y-axis positive direction) of the stroke thereof as illustrated in FIG. 18.

When a left-handed user uses the robot teaching device 10', the moving portion 34 is arranged at the second end (the end in the y-axis positive direction) of the stroke thereof as illustrated in FIG. 10, while the cover 94 is arranged at the second end (the end in the y-axis negative direction) of the stroke thereof as illustrated in FIG. 21.

A robot teaching device 70' illustrated in FIG. 23 is an embodiment in which the cover 94 is applied to the above-described robot teaching device 70. In the robot teaching device 70', the cover 94 is provided so as to be able to accommodate the protrusion 76 of the enable switch operating section 72.

Figure 24:
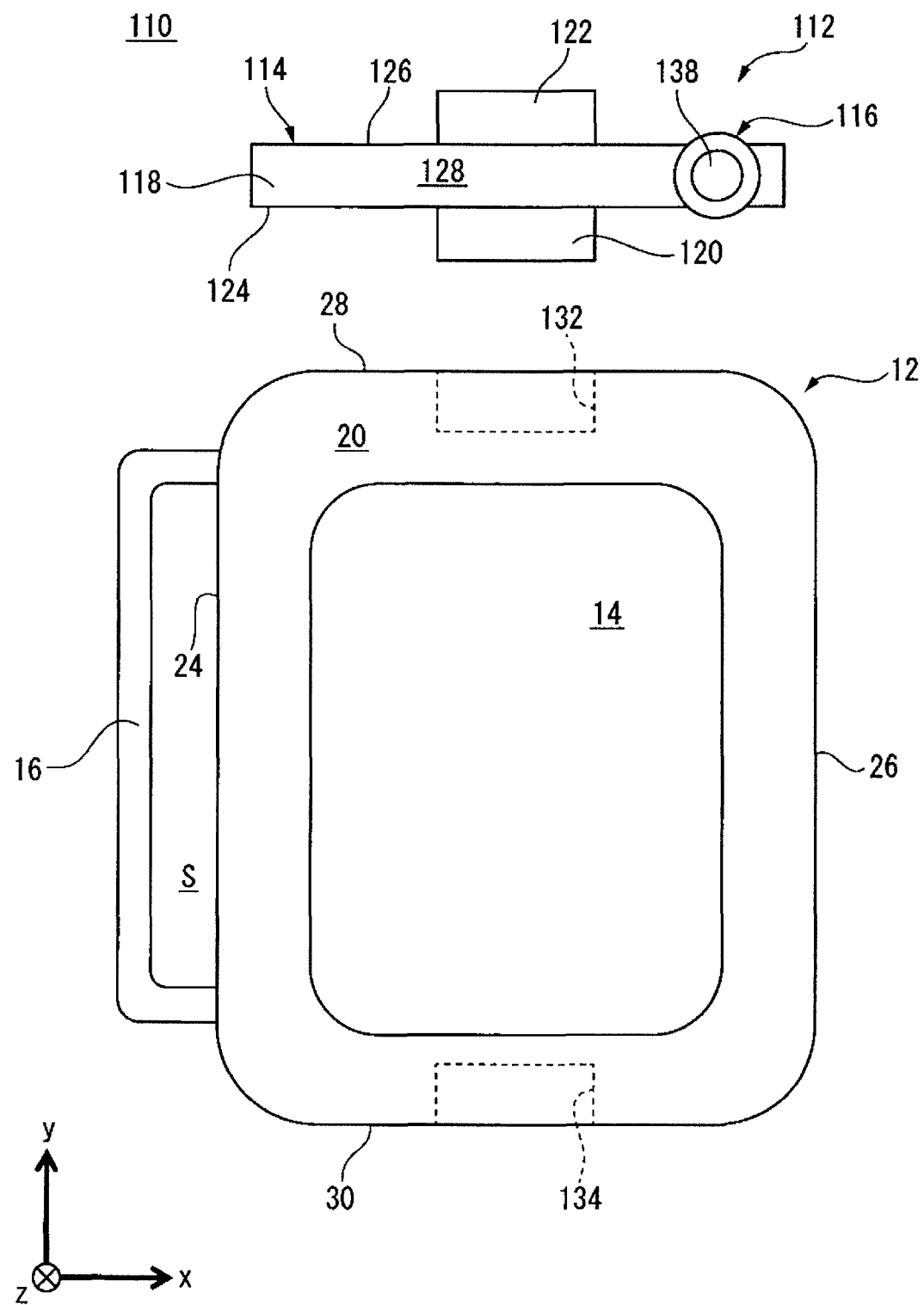
FIG. 24 is a front view of a robot teaching device according to still another embodiment.
Figure 25:
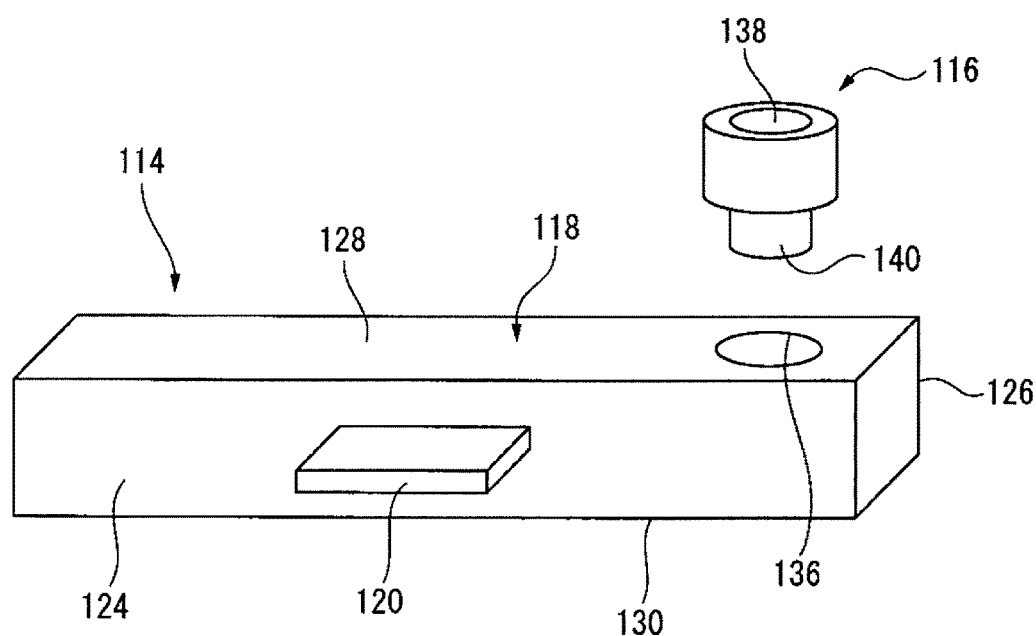
FIG. 25 is an exploded perspective view of a first external device illustrated in FIG. 24.

Next, a robot teaching device 110 according to still another embodiment will be described with reference to FIGS. 24 and 25. The robot teaching device 110 includes the main body 12, the display 14, the hand guide 16, and an external device 112 (first external device). The robot teaching device 110 may include the above-described enable switch operating section 18, 52, 72, or 92 at the back surface side of the main body 12. Alternatively, the robot teaching device 110 may include the above-described cover 94 at the back, surface side of the main body 12.

The external device 112 includes an interface device 114 and an emergency stop switch assembly 116. The interface device 114 includes an interface main body 113, a first connector 120, and a second connector 122.

The interface main body 118 includes an end face 124 in the y-axis negative direction, an end face 126 in the y-axis positive direction opposite the end face 124, an end face 128 in the z-axis negative direction, and an end face 130 in the z-axis positive direction opposite the end face 128.

The first connector 120 is provided so as to protrude in the y-axis negative direction from the end face 124 of the interface main body 118. The first connector 120 is removably connected to a connector (e.g., a USB port) 132 formed on the side surface 28 of the main body 12.

On the other hand, the second connector 122 is provided so as to protrude in the y-axis positive direction from the end face 126 of the interface main body 118. The second connector 122 is removably connected to a connector 134 formed on the side surface 30 of the main body 12. A switch interface (IF) 136 (FIG. 25) is formed on the end face 128 of the interface main body 118.

The emergency stop switch assembly 116 includes an emergency stop switch 138 and a switch connector 140 provided at the emergency stop switch 138. The emergency stop switch 138 can be pressed in the z-axis positive direction. The emergency stop switch 138 transmits an urgent stop signal for urgently stopping a robot when it is pressed. The switch connector 140 is removably connected to the switch IF 136 provided at the interface main body 118.

Figure 26:
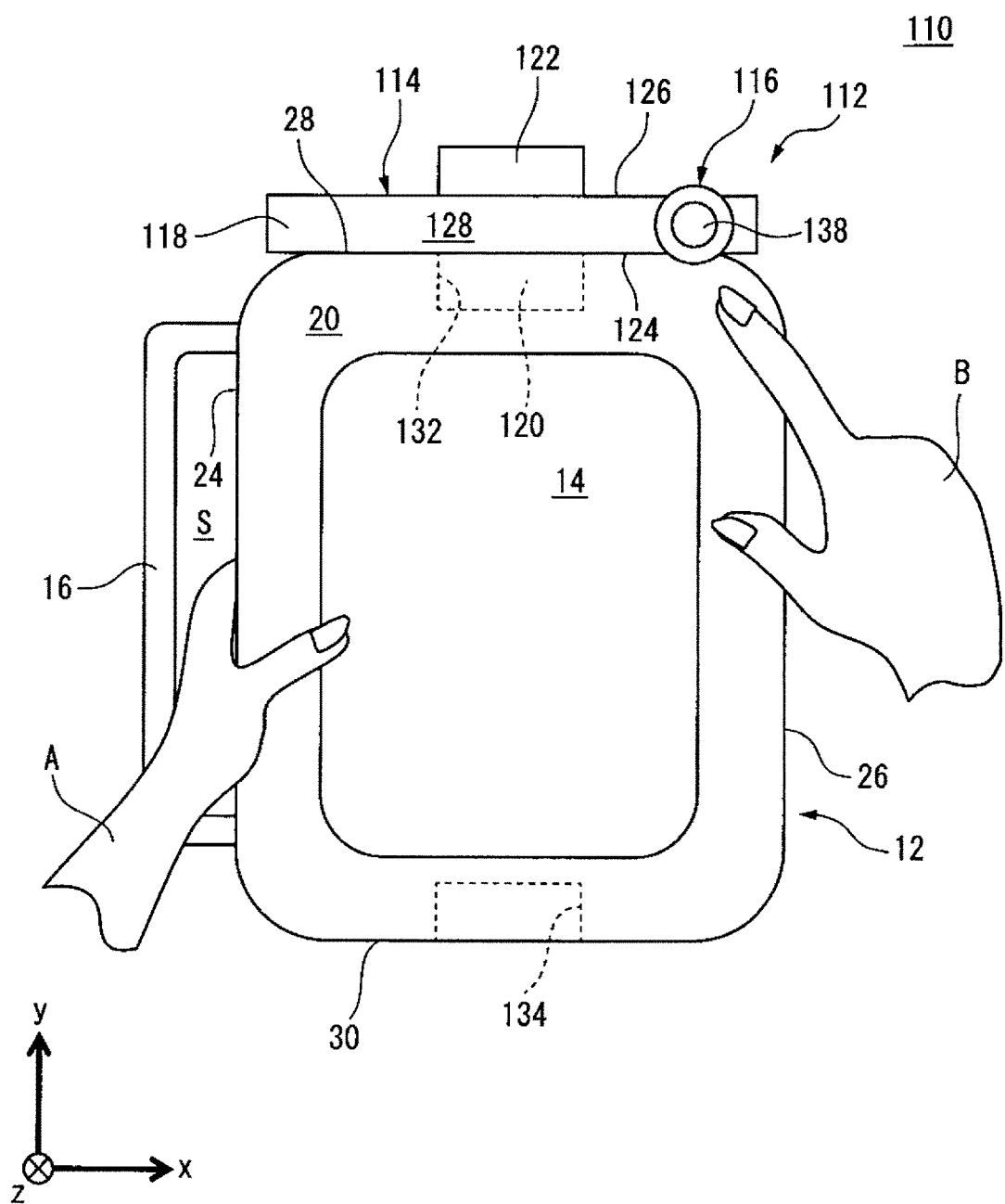
FIG. 26 illustrates a typical example of a use in which a right-handed user uses the robot teaching device illustrated in FIG. 24.

Next, with reference to FIG. 26, a typical example in which a right-handed user uses the robot teaching device 110 according to this embodiment is described. In this case, the external device 112 is mounted on the side surface 28 of the main body 12 such that the first connector 120 thereof is inserted in the connector 132 of the main body 12.

The emergency stop switch assembly 116 is mounted on the end face 128 of the interface device 114 such that the switch connector 140 thereof is inserted in the switch IF 136. In this way, the emergency stop switch 138 is electrically connected to a CPU (not illustrated) built in the main body 12 via the interface device 114.

As illustrated in FIG. 26, the right-handed user typically holds the side surface 24 of the main body 12 with the left hand A. At this time, the emergency stop switch 138 is arranged at a position that is close to the side surface 26 opposite the side surface 24 held by the left hand A and that is located at the upper end (i.e., the side surface 28) of the main body 12 when seen from the user.

Figure 27:
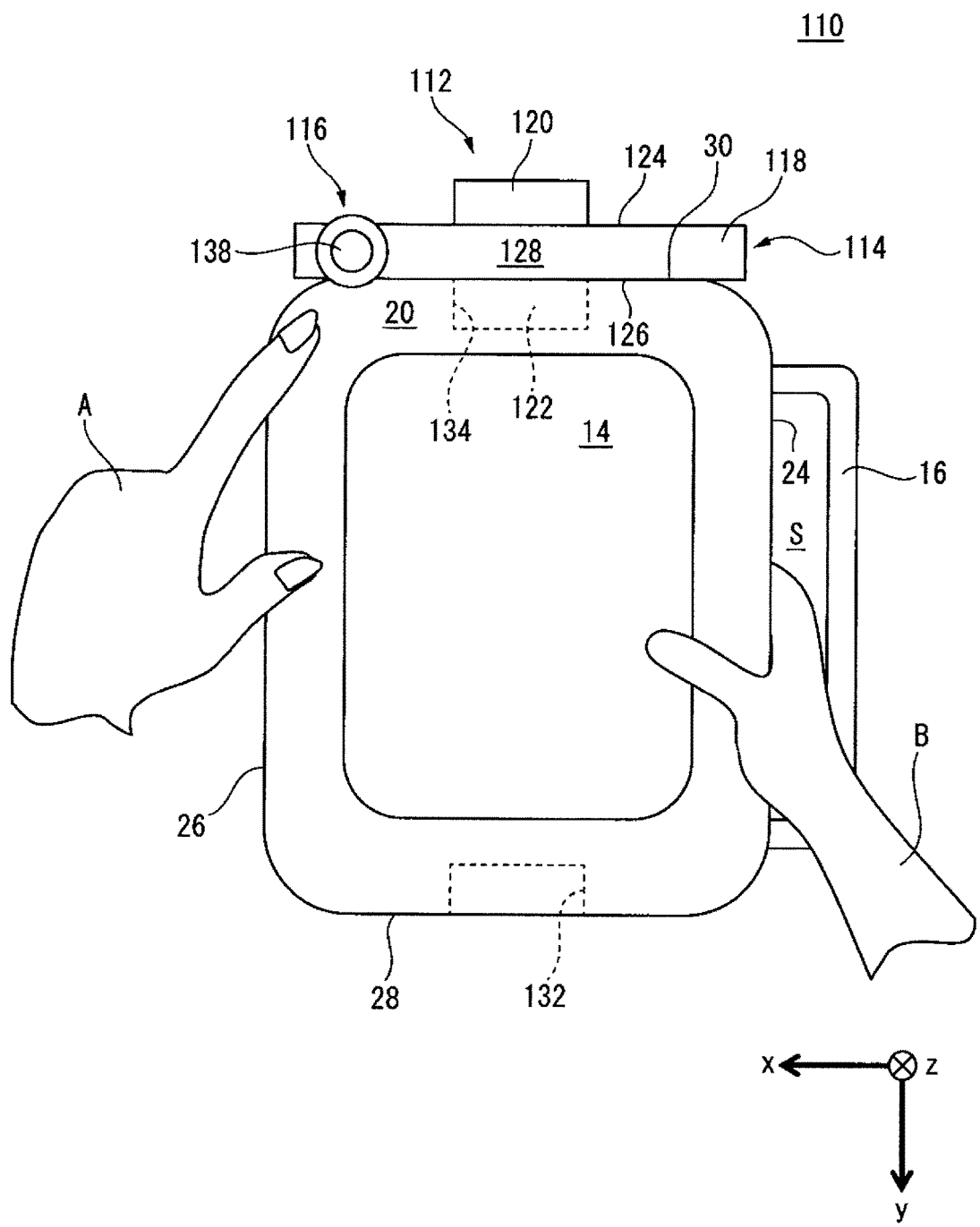
FIG. 27 illustrates a typical example of a use in which a left-handed user uses the robot teaching device illustrated in FIG. 24.

Next, with reference to FIG. 27, a typical example in which a left-handed user uses the robot teaching device 110 is described. In this case, the external device 112 is mounted on the side surface 30 of the main body 12 such that the second connector 122 is inserted in the connector 134 of the main body 12.

As illustrated in FIG. 27, the left-handed user typically holds the side surface 24 of the main body 12 with the right hand B. At this time, the emergency stop switch 138 is arranged at a position that is close to the side surface 26 opposite the side surface 24 held by the right hand B and that is located at the upper end (i.e., the side surface 30) of the main body 12 when seen from the user.

Thus, in this embodiment, the external device 112 is provided with the two connectors 120 and 122 respectively protruding in the directions opposite to each other. According to this configuration, the emergency stop switch 138 can be located at the relatively same position with respect to a hand holding the main body 12, regardless of the user's dominant hand.

Therefore, since the emergency stop switch 138 can be easily operated with one hand opposite the other hand that holds the main body 12, it is possible for the user to easily operate the emergency stop switch 138 regardless of his/her dominant hand.

Note that, if the switch IF 136 of the interface main body 118 is arranged at the center in the x-axis direction on the end face 128 of the interface main body 118 in the external device 112, the second connector 122 can be omitted.

Figure 28:
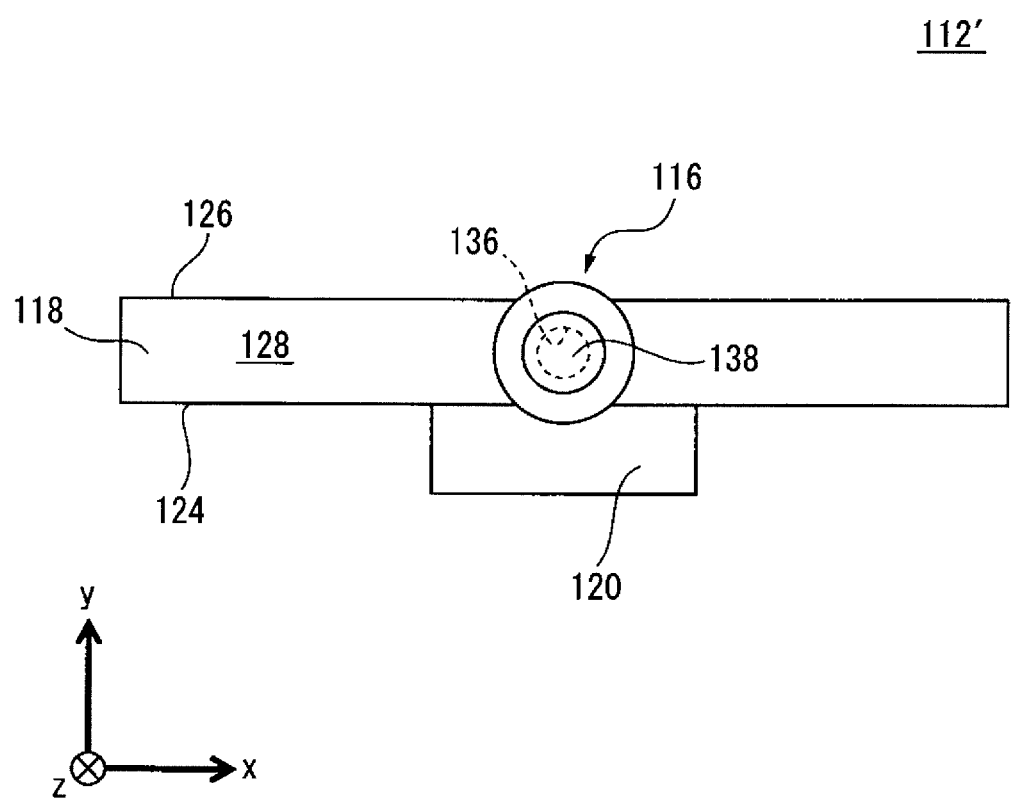
FIG. 28 is a diagram of a first external device according to another embodiment.

Such an embodiment is illustrated in FIG. 28. In an external device 112' illustrated in FIG. 28, the switch IF 136 is arranged at the center in the x-axis direction on the end face 128 of the interface main body 118.

Due to this configuration, the emergency stop switch 138 is arranged at the center in the x-axis direction of the interface main body 118 when the emergency stop switch assembly 116 is mounted to the interface main body 118.

If a right-handed user uses this external device 112' by mounting it to the main body 12, the external device 112' is mounted on the side surface 28 of the main body 12 such that the first connector 120 is inserted in the connector 132.

On the other hand, if a left-handed user uses this external device 112' by mounting it to the main body 12, the external device 112' is mounted on the side surface of the main body 12 such that the first connector 120 is inserted in the connector 134.

In the uses for both the right-handed and left-handed users, the emergency stop switch 138 is arranged at the center of the upper end (side surface 28 or 30) of the main body 12 when seen from the user, and therefore the emergency stop switch 138 can be similarly operated regardless of the user's dominant hand.

Figure 29:
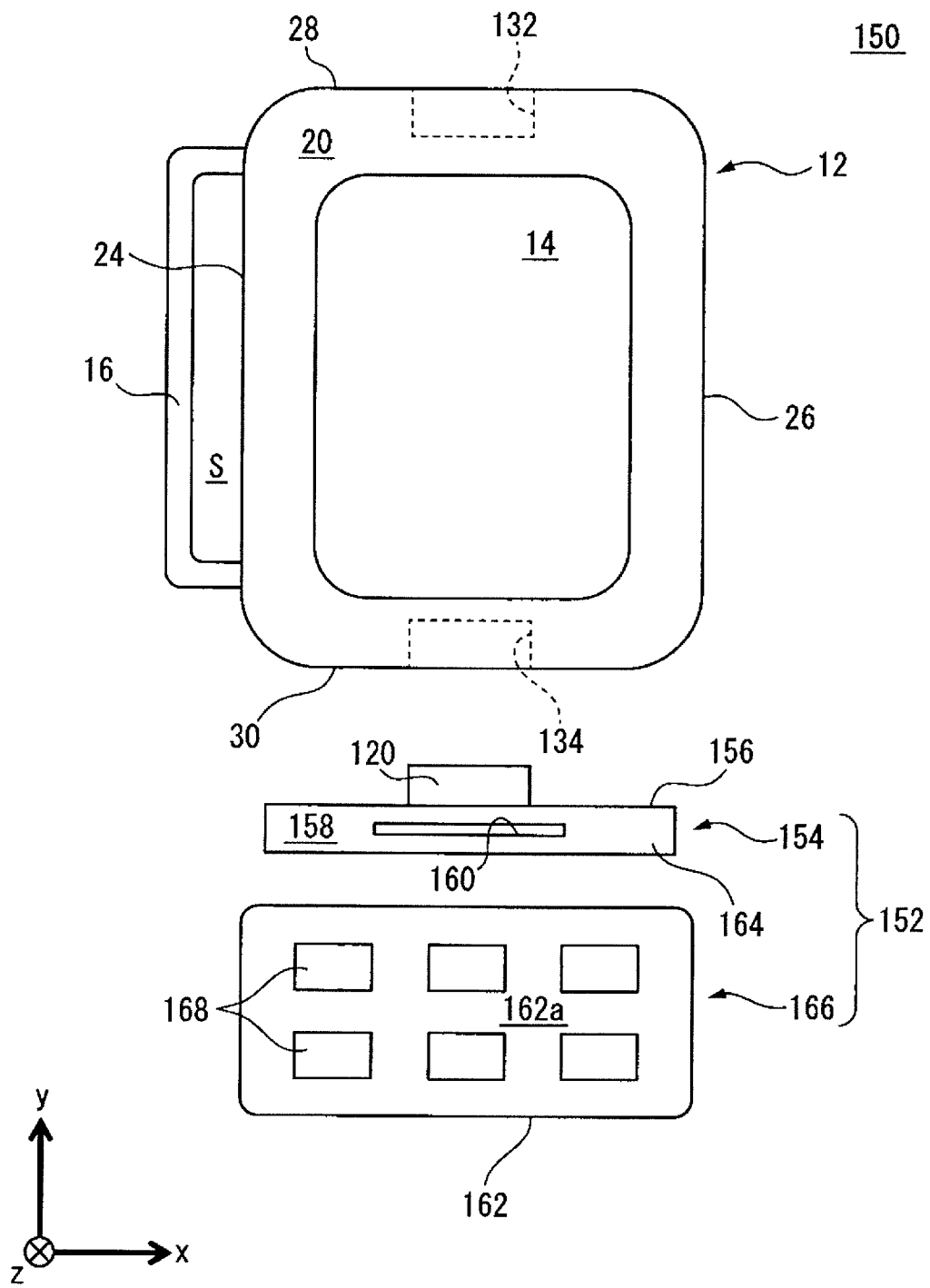
FIG. 29 is a front view of a robot teaching device according to still another embodiment.

Next, a robot teaching device 150 according to still another embodiment will be described with reference to FIG. 29. The robot teaching device 150 includes the main body 12, the display 14, the hand guide 16, and an external device 152 (second external device).

The robot, teaching device 150 may include the above-described enable switch operating section 18, 52, 72, or 92 at the back surface side of the main body 12. Further, the robot teaching device 110 may include the above-described cover 94 at the back surface side of the main body 12.

The external device 152 includes an interface device 154 and a keyboard 166. The interface device 154 includes an interface main body 164 and the connector 120.

The interface main body 164 includes an end face 156 in the y-axis positive direction, an end face 158 in the z-axis negative direction, and a keyboard IF 160 provided on the end face 158. The connector 120 is provided so as to protrude in the y-axis positive direction from the end face 156.

The keyboard 166 includes a keyboard main body 162 and a plurality of hard keys 168 arranged on a front surface 162*a* of the keyboard main body 162. A connector (not illustrated) to be removably connected to the keyboard IF 160 is provided at the back surface side of the keyboard 166.

If a right-handed user uses the robot teaching device 150 according to this embodiment, the interface device 154 is typically mounted on the side surface 30 of the main body 12 such that the connector 120 thereof is inserted in the connector 134 of the main body 12.

The keyboard 166 is installed to the interface device 154 such that the connector thereof is inserted in the keyboard IF 160. In this way, the keyboard 166 is electrically connected to the CPU (not illustrated) built in the main body 12 via the interface device 154. Thus, the user can input information to the robot teaching device 150 by operating the hard keys 168 of the keyboard 166.

If a left-handed user uses the robot teaching device 150, the interface device 154 is typically mounted on the side surface 28 of the main body 12 such that the connector 120 thereof is inserted in the connector 132 of the main body 12. Further, the keyboard 166 is installed to the interface device 154 such that the connector thereof is inserted in the keyboard IF 160.

Thus, in this embodiment, the external device 152 is arranged at the lower end (side surface 30 or 28) of the main body 12 when seen from the user, regardless of the user's dominant hand. According to this configuration, it is possible to arrange the hard keys 168 at the same position when seen from the user and operate them, even when the user holds the main body 12 with any of his/her left hand A and the right hand B.

Note that, in the above-described robot teaching device 10, 10', 50, 70, 70', 90, 110, or 150, a connector that is rotatable about an axis orthogonal to the back surface 22 may be provided on the back surface 22 of the main body 12.

Figure 30:
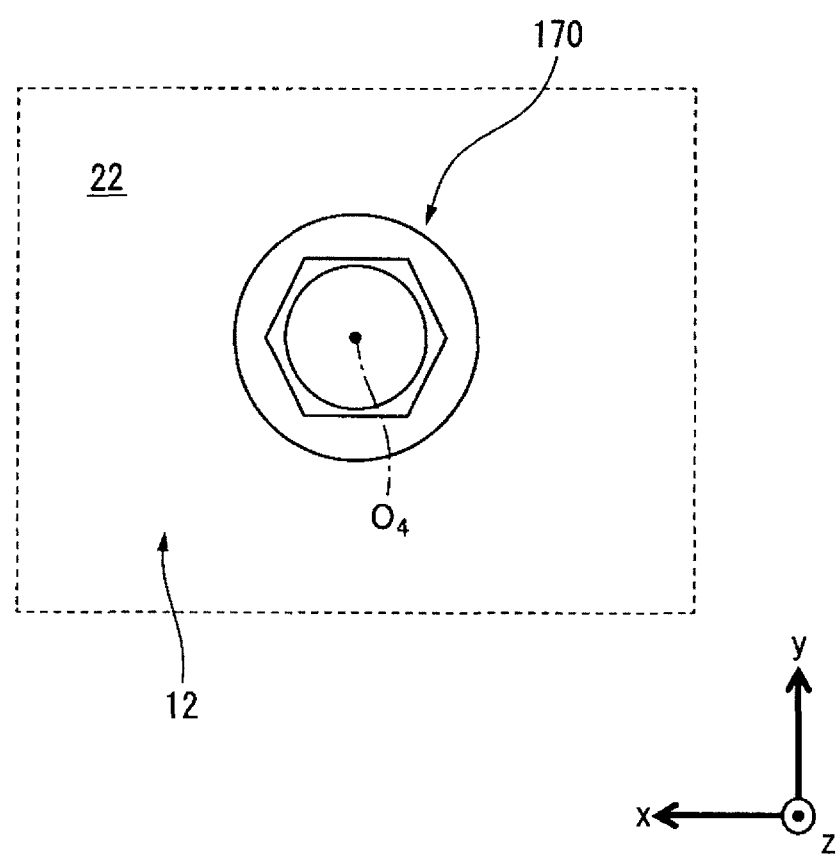
FIG. 30 is a diagram of a connector according to an embodiment.

Such a connector is illustrated in FIG. 30. A connector 170 illustrated in FIG. 30 is provided on the back surface 22 of the main body 12 so as to be rotatable about an axis $O_4$. The axis $O_4$ extends in the z-axis direction so as to be orthogonal to the back surface 22. A communication cable (not illustrated) for communicating with an external device such as a robot controller is connected to this connector 170.

According to such a rotary connector 170, when the main body 12 is rotated about the z-axis by 180° from the use illustrated in FIG. 7 to the use illustrated in FIG. 9, the connector 170 also rotates in response to the rotation of the main body 12. Thereby, it is possible to prevent the communication cable connected to the connector 170 from being twisted.

Note that, the above-described enable switch operating section 18, 52, 72, or 92 may be provided on the front surface 20 of the main body 12. In this case, the enable switch operating section 18, 52, 72, or 92 may be arranged such that a user can operate the enable switch operating section 18, 52, 72, or 92 with his/her thumb. Also in this case, the cover 94 may be provided on the front surface 20 of the main body 12.

Figure 31:
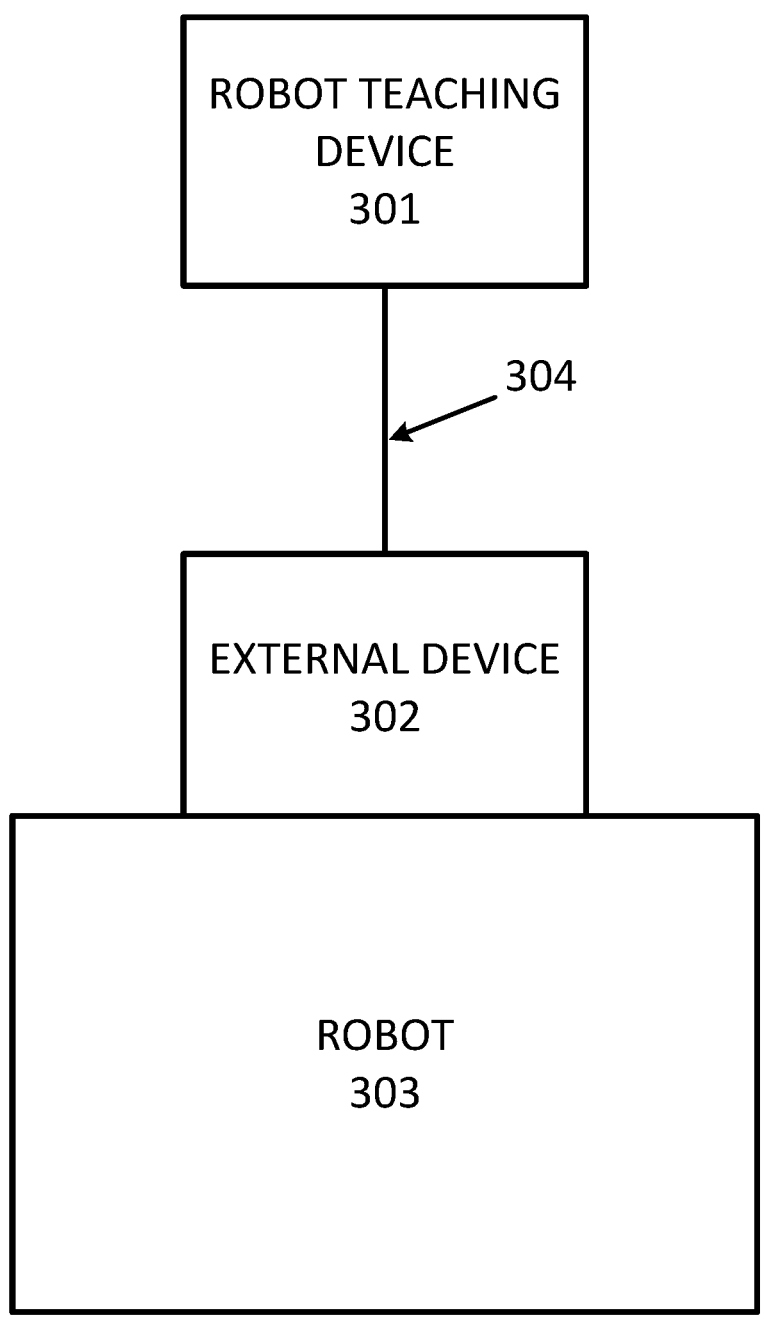
FIG. 31 is view of the robot, cable and external device according to an embodiment.

FIG. 31 shows an overview of the system including robot teaching device 301 connected to external device 302 (e.g., controller) of robot 303 via cable 304.

While the present disclosure has been described through the embodiments, the above-described embodiments do not limit the invention according to the claims.

The invention claimed is:

1. A hand-held robot teaching device having an enable switch therein, comprising:
   a main body including a holding portion configured to be held by one hand; and
   an enable switch operating section provided at the holding portion and configured to be operated by a reference switching motion by a hand holding the holding portion at a reference position,
   wherein the enable switch operating section includes:
   a base provided at the main body so as to be pressed; and
   a moving portion provided on an end face of the base facing to the outside so as to be movable in a direction intersecting a pressing direction of the base,
   wherein the moving portion is movable between a first position, at which a finger of a left hand can touch the moving portion when the left hand holds the holding portion and carries out the reference switching motion, and a second position, at which a finger of a right hand can touch the moving portion when the right hand holds the holding portion and carries out the reference switching motion.

2. The robot teaching device of claim 1, wherein the moving portion is provided to be slidable on the end face of the base, or to be rotatable about an axis intersecting the end face of the base.

3. A hand-held robot teaching device having an enable switch therein, comprising:
   a main body including:
   a side surface extending in a first direction; and
   a holding portion provided at the side surface and configured to be held by one hand; and
   an enable switch operating section provided at the holding portion and configured to be operated by a reference switching motion by a hand holding the holding portion at a reference position,
   wherein the enable switch operating section includes:
   a base provided at the main body so as to be rotatable about an axis extending in parallel with the first direction; and
   an urging part configured to urge the base toward a first rotation position about the axis.

4. The robot teaching device of claim 3, wherein the base is formed with a protruding portion outwardly protruding from an outer peripheral surface of the base and extending in a direction of the axis.

5. A hand-held robot teaching device having an enable switch therein, comprising:
   a main body including a holding portion configured to be held by one hand; and
   an enable switch operating section provided at the holding portion and configured to be operated by a reference switching motion by a hand holding the holding portion at a reference position,
   wherein the enable switch operating section includes:
   a base provided at the main body so as to be pressed; and
   a cover provided at the main body so as to be movable between a first cover position at which the cover covers a first portion of the base and a second cover position at which the cover covers a second portion of the base different from the first portion.

6. The robot teaching device of claim 5, wherein the enable switch operating section includes the base extending in parallel with the holding portion,
   wherein the cover is slidable in parallel with the holding portion.

7. A hand-held robot teaching device having an enable switch therein, comprising:
   a main body including a holding portion configured to be held by one hand;
   an enable switch operating section provided at the holding portion and configured to be operated by a reference switching motion by a hand holding the holding portion at a reference position; and
   a connector which is provided on a back surface of the main body, and to which a cable for communicating with an external device is connected, the connector being rotatable about an axis orthogonal to the back surface of the main body,
   wherein the enable switch operating section includes a switching motion specifying mechanism configured to facilitate the reference switching motion at the reference position to be easier than another motion.

8. A hand-held robot teaching device having an enable switch therein, comprising:
   a main body including a holding portion configured to be held by one hand;
   an enable switch operating section provided at the holding portion and configured to be operated by a reference switching motion by a hand holding the holding portion at a reference position; and
   a first external device removably attached to the main body and including an emergency stop switch for urgently stopping the robot,
   wherein the enable switch operating section includes a switching motion specifying mechanism configured to facilitate the reference switching motion at the reference position to be easier than another motion.

9. The robot teaching device of claim 8, wherein the first external device includes:
   a first end face and a second end face opposite the first end face;
   a first connector provided to outwardly protrude from the first end face, and removably connected to a connector provided at the main body; and
   a second connector provided to outwardly protrude from the second end face, and removably connected to another connector provided at the main body.

10. A hand-held robot teaching device having an enable switch therein, comprising:
    a main body including a holding portion configured to be held by one hand;
    an enable switch operating section provided at the holding portion and configured to be operated by a reference switching motion by a hand holding the holding portion at a reference position; and a second external device removably attached to the main body and including a hard key for inputting information to the robot teaching device,
wherein the enable switch operating section includes a switching motion specifying mechanism configured to facilitate the reference switching motion at the reference position to be easier than another motion.

* * * * *